United States Patent [19]

Yamashita et al.

[11] Patent Number: 5,214,269
[45] Date of Patent: May 25, 1993

[54] METHOD FOR PERFORMING TRANSACTION

[75] Inventors: Khotaro Yamashita, Machida; Masaaki Hiroya, Kawasaki; Kunihiro Nomura, Sagamihara; Akihiro Kawaoka, Kawasaki, all of Japan

[73] Assignee: Hitachi, Ltd., Tokyo, Japan

[21] Appl. No.: 839,078

[22] Filed: Feb. 24, 1992

Related U.S. Application Data

[63] Continuation of Ser. No. 493,703, Mar. 15, 1990, abandoned.

[30] Foreign Application Priority Data

Mar. 17, 1989 [JP] Japan ..................... 1-63646

[51] Int. Cl.$^5$ .................. G06F 15/30; G07F 7/08
[52] U.S. Cl. .................. 235/379; 235/380; 902/10
[58] Field of Search .......... 235/379, 381, 380; 902/10, 13

[56] References Cited

U.S. PATENT DOCUMENTS

| | | | |
|---|---|---|---|
| Re. 30,773 | 10/1981 | Glaser et al. | 235/379 |
| 4,593,183 | 6/1986 | Fukatsu | 235/379 |
| 4,636,947 | 1/1987 | Ward | 235/379 |

FOREIGN PATENT DOCUMENTS

| | | | |
|---|---|---|---|
| 157416 | 10/1985 | European Pat. Off. | 235/379 |
| 62-237572 | 10/1987 | Japan . | |
| 63-244267 | 10/1988 | Japan . | |

OTHER PUBLICATIONS

M. D. Grigoriadis. The Design of Hiesarchical Banking Networks. 1977.

Primary Examiner—Vincent P. McGraw
Attorney, Agent, or Firm—Fay, Sharpe, Beall, Fagan, Minnich & McKee

[57] ABSTRACT

The content of a banking transaction inputted through a terminal of specifying the transaction is executed if the transaction has sufficient related financial evidence (for example balance). In turn, in the case that there is no financial evidence or insufficient financial evidence, (for example, where the cash is selected as a transaction financial source and the cash is not deposited yet or a balance of the deposit selected as a financial source is lacking) an execution of the transaction is temporarily halted and the content of the halted transaction is stored in a file of halted transactions. Data relating to a transaction financial source is stored in a file of halted transactions; the information is checked when the balance of the account is renewed by a deposit or transfer, that is when it changes, and with respect to such checking execution of the halted transaction is judged as to whether it can now be carried out. Thereby, when the financial resources relating to a halted execution are changed and judged to now be sufficient, the halted transaction is automatically executed. In view of this fact, it is then possible to specify the transaction without having any financial evidence.

8 Claims, 19 Drawing Sheets

| I.D. NO. | TYPE | ACT. NO. | BRANCH | BALANCE | MATURITY DATE | FLAG |
|---|---|---|---|---|---|---|
| 0001 | SAVINGS | 1001 | | 100000 | | 0 |
| 0002 | SAVINGS | 1002 | | 100000 | | 0 |
| 0003 | REGULAR | 2001 | 1 | 0 | CANCELLATION | 0 |
| | REGULAR | 2001 | 2 | 500000 | 801020 | 0 |
| | SAVINGS | 1003 | | 23000 | | 0 |
| 0004 | SAVINGS | 1004 | | 15000 | | 0 |
| 0005 | CHECKING | 3001 | | 720000 | | 0 |
| 0123 | SAVINGS | 1234 | | 15000 | | 0 |
| | REGULAR | 2345 | 1 | 50000 | 890112 | 0 |
| 0234 | SAVINGS | 1005 | | 300000 | | 0 |

FIG. 5

| CONDITION | CONTENT OF TRANSACTION |
|---|---|
| 50,000 YEN IS DEPOSITED | FOR 1001, PLUS 50,000 YEN |
| BALANCE OF 1001> 150,000 YEN | FOR 1001, MINUS 150,000 YEN |
| | FOR BANK B 8236, PLUS 150,000 YEN |

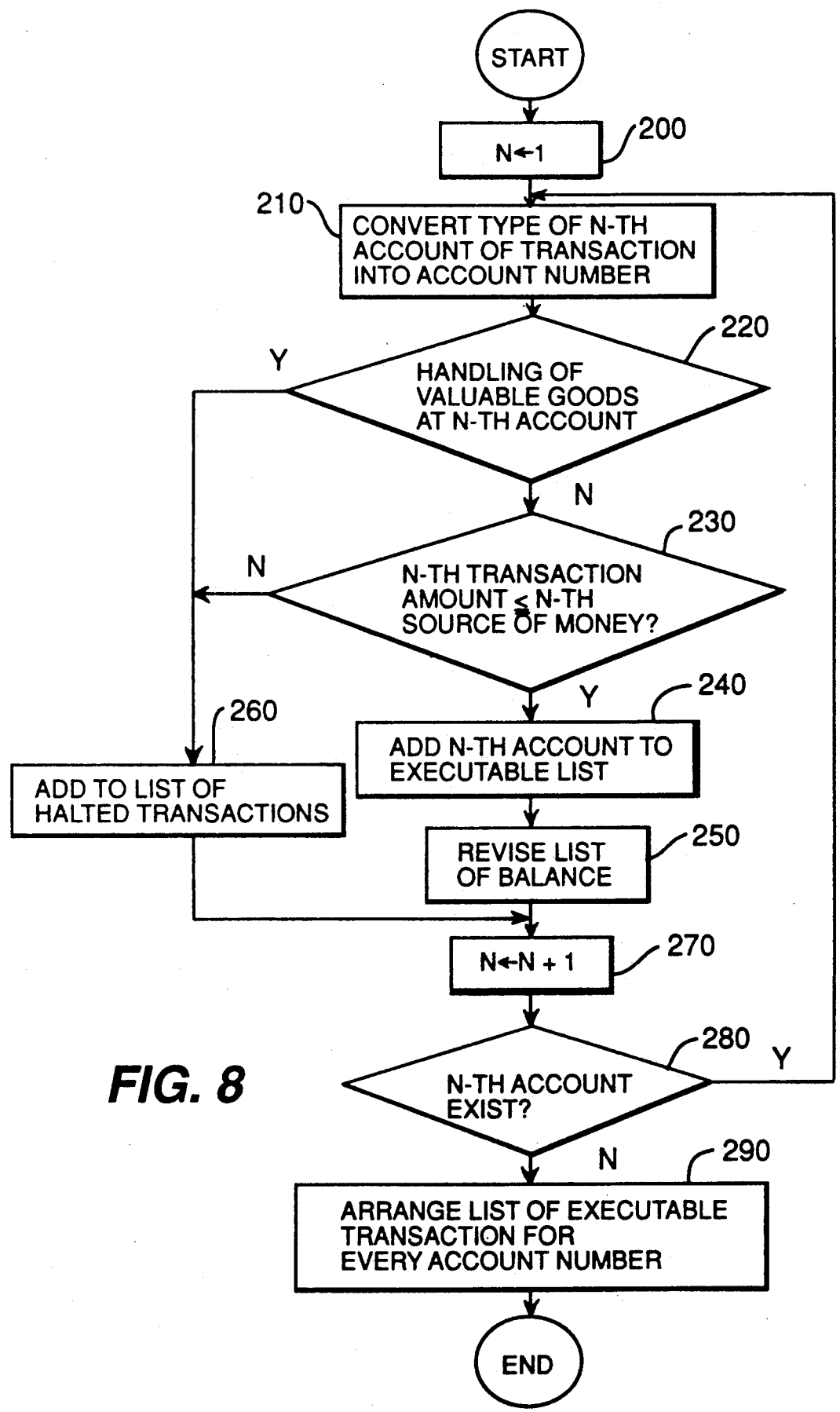

| 1 TYPE OF ACCOUNT | 2 ACCOUNT NUMBER | 3 BRANCH NUMBER | 4 BALANCE | 5 MATURITY DATE | 80 |
|---|---|---|---|---|---|
| SAVINGS | 1001 | — | 100000 | — | 6 |

FIG. 9(a)

| 1 TYPE OF ACCOUNT | 2 ACCOUNT NUMBER | 3 BRANCH NUMBER | 4 BALANCE | 5 MATURITY DATE | 81 |
|---|---|---|---|---|---|
| SAVINGS | 1001 | — | 150000 | — | 6 |

FIG. 9(b)

| 1 TYPE OF ACCOUNT | 2 ACCOUNT NUMBER | 3 BRANCH NUMBER | 4 BALANCE | 5 MATURITY DATE | 82 |
|---|---|---|---|---|---|
| SAVINGS | 1001 | — | 0 | — | 6 |

| | |
|---|---|
| 1 — | CONTENT OF TRANSACTION |
| 2 — | DEPOSIT 500,000 YEN BY CHECK TO SAVINGS DEPOSIT AT COUNTER |
| 3 — | TRANSFER 750,000 YEN FROM SAVINGS DEPOSIT TO BANK B 8236 |

| CONDITION | CONTENT OF TRANSACTION |
|---|---|
| 500,000 YEN BY CHECK IS DEPOSITED AT COUNTER | FOR 1001, PLUS 500,000 YEN |
| BALANCE OF 1001 ≥ 750,000 YEN | FOR 1001, MINUS 750,000 YEN |
| | FOR 1001, PLUS 750,000 YEN |

(labels: 4, 5, 6, 7, 7', 8, 9)

| TYPE OF ACCOUNT | ACCOUNT NUMBER | BRANCH NUMBER | BALANCE | MATURITY DATE |
|---|---|---|---|---|
| SAVINGS | 1005 | — | 300000 | — |

(labels: 9', 10, 11, 12, 13, 14)

*FIG. 18*

| | TYPE OF ACCOUNT | ACCOUNT NUMBER | BRANCH NUMBER | BALANCE | MATURITY DATE | |
|---|---|---|---|---|---|---|
| 1 → | | 5 | 6 | 7 | 8 | 62 |
| 2 → | REGULAR | 2001 | 1 | — | CANCELLATION | ← 9 |
| 3 → | REGULAR | 2001 | 2 | 500000 | 881020 | |
| 4 → | SAVINGS | 1003 | — | 23000 | — | |

FIG. 24(a)

| | TYPE OF ACCOUNT | ACCOUNT NUMBER | BRANCH NUMBER | BALANCE | MATURITY DATE | |
|---|---|---|---|---|---|---|
| 10 → | | 15 | 16 | 17 | | 64 / 18 |
| 11 → | REGULAR | 2001 | 1 | — | CANCELLATION | ← 19 |
| 12 → | REGULAR | 2001 | 2 | | CANCELLATION | ← 20 |
| 13 → | SAVINGS | 1003 | — | 23000 | — | |
| 14 → | SPECIAL | 8010 | — | 500000 | — | |

FIG. 24(b)

| | TYPE OF ACCOUNT | ACCOUNT NUMBER | BRANCH NUMBER | BALANCE | MATURITY DATE | |
|---|---|---|---|---|---|---|
| 10 → | | 15 | 16 | 17 | | 71 / 18 |
| 11 → | REGULAR | 2001 | 1 | — | CANCELLATION | ← 19 |
| 12 → | REGULAR | 2001 | 2 | | CANCELLATION | ← 20 |
| 13 → | SAVINGS | 1003 | — | 23000 | — | |
| 14 → | SPECIAL | 8010 | — | 350000 | — | |

| TYPE OF ACCOUNT | ACCOUNT NUMBER | BRANCH NUMBER | BALANCE | MATURITY DATE |
|---|---|---|---|---|
| REGULAR | 2001 | 1 | — | CANCELLATION |
| REGULAR | 2001 | 2 | — | CANCELLATION |
| SAVINGS | 1003 | — | 23000 | — |
| SPECIAL | 8010 | — | 300000 | — |

FIG. 25

| CUSTOMER I.D. | TYPE OF ACCOUNT | ACCOUNT NUMBER | BRANCH NUMBER | BALANCE | MATURITY DATE | FLAG |
|---|---|---|---|---|---|---|
| 0001 | SAVINGS | 1001 | — | 0 | — | 0 |
| 0002 | SAVINGS | 1002 | 1 | 70000 | — | 0 |
| 0003 | REGULAR | 2001 | — | 0 | CANCELLATION | 0 |
| 0003 | REGULAR | 2001 | 2 | 500000 | 801020 | 0 |
|  |  | 1003 | — | 23000 | — | 0 |
| 0004 | SAVINGS | 1004 | — | 15000 | — | 1 |
| 0005 | CHECKING | 3001 | — | 720000 | — | 0 |
| 0123 | SAVINGS | 1234 | 1 | 45000 | — | 0 |
| 0234 | REGULAR | 2345 | — | 50000 | 890112 | 0 |
|  | SAVINGS | 1005 | — | 50000 | — | 0 |

63

| | CONTENT OF TRANSACTION |
|---|---|
| 1 | |
| 2 | CANCEL NO. 2 OF REGULAR DEPOSIT AND TRANSFER TO SPECIAL DEPOSIT |
| 3 | TRANSFER 150,000 YEN TO BANK A 8765 FROM SPECIAL DEPOSIT |
| 4 | TRANSFER 500,000 YEN FOR AUTOMOBILE TAX FROM SPECIAL DEPOSIT |
| 5 | PAY 100,000 YEN FROM SPECIAL DEPOSIT AT COUNTER |
| 6 | TRANSFER 200,000 YEN BY CHECK AT COUNTER TO SPECIAL DEPOSIT |
| 7 | TRANSFER 400,000 YEN FROM SPECIAL DEPOSIT TO TWO-YEAR REGULAR DEPOSIT |

| CONTENT OF TRANSACTION | 8 |
|---|---|
| CANCEL 2007-2 | 9 |
| FOR 8070, PLUS 500,000 YEN | 10 |
| FOR 8070, MINUS 500,000 YEN | 11 |
| FOR BANK A 8765, PLUS 150,000 YEN | 12 |
| FOR 8070, MINUS 50,000 YEN | 13 |
| FOR 8888, PLUS 50,000 YEN | 14 |

| CONTENT OF TRANSACTION | 15 |
|---|---|
| CANCEL 2007-2 | 16 |
| FOR 8070, PLUS 300,000 YEN | 17 |
| FOR BANK A 8675, PLUS 150,000 YEN | 18 |
| FOR 8888, PLUS 50,000 YEN | 19 |

| CONTENT OF TRANSACTION | CONTENT OF TRANSACTION |
|---|---|
| REQUEST OF WITHDRAWAL BALANCE OF 8070 > 100,000 YEN | FOR 8070, MINUS 100,000 YEN |
| | WITHDRAW 100,000 YEN AT COUNTER |
| 200,000 YEN IS DEPOSITED BY CHECK | FOR "CHECKING ACCOUNT NO." MINUS 200,000 YEN |
| | FOR 8070, PLUS 200,000 YEN |
| BALANCE OF 8070 > 400,000 YEN | FOR 8070, MINUS 400,000 YEN |
| | FOR 2007-3, PLUS 400,000 YEN AND SET MATURITY DATE TO "DAY AFTER TWO YEARS SINCE EXECUTION OF TRANSACTION" |

69

| CONTENT OF TRANSACTION |
|---|
| WITHDRAWAL OF 100,000 YEN AT COUNTER |
| DEPOSIT 200,000 YEN BY CHECK AT COUNTER |

1 — CONTENT OF TRANSACTION
2 — WITHDRAWAL OF 100,000 YEN AT COUNTER
3 — DEPOSIT 200,000 YEN BY CHECK AT COUNTER

| CONTENT OF TRANSACTION |
|---|
| FOR 8010, MINUS 100,000 YEN |
| WITHDRAW 100,000 YEN AT COUNTER |
| FOR 3007, MINUS 200,000 YEN |
| FOR 8070, PLUS 200,000 YEN |

4 — CONTENT OF TRANSACTION
5 — FOR 8010, MINUS 100,000 YEN
6 — WITHDRAW 100,000 YEN AT COUNTER
7 — FOR 3007, MINUS 200,000 YEN
8 — FOR 8070, PLUS 200,000 YEN

| CONDITION | CONTENT OF TRANSACTION |
|---|---|
| BALANCE OF 8010 > 400,000 YEN | FOR 8010, MINUS 400,000 YEN<br>FOR 2001-3, PLUS 400,000 YEN |

*FIG. 31*

| | 75 |
|---|---|
| 1 | CONTENT OF TRANSACTION |
| 2 | TRANSFER 500,000 YEN BY CHECK AT COUNTER TO SPECIAL DEPOSIT |
| 3 | TRANSFER 150,000 YEN TO 5432 FROM SPECIAL DEPOSIT |
| 4 | TRANSFER 100,000 YEN TO BANK B 6543 FROM SPECIAL DEPOSIT |
| 5 | TRANSFER 250,000 YEN FROM SPECIAL DEPOSIT TO REGULAR DEPOSIT |

*FIG. 32*

| | 76 |
|---|---|
| CONTENT OF TRANSACTION | 6 |
| FOR 8233 (SPECIAL DEPOSIT), MINUS 500,000 YEN | 7 |
| FOR BANK A 6543, PLUS 100,000 YEN | 8 |
| FOR BANK B 6543, PLUS 1000,000 YEN | 9 |
| FOR 2007/1, PLUS 250,000 YEN | 10 |

*FIG. 33*

METHOD FOR PERFORMING TRANSACTION

This application is a continuation of application Ser. No. 07/493,703, filed Mar. 15, 1990, now abandoned.

BACKGROUND OF THE INVENTION

The present invention relates to a system for performing financial transactions such as depositing, withdrawal, transferring, exchanging goods for cash, and the like, for example at a banking institution.

With respect to the prior art, a customer usually describes a transaction in a specific sheet, the customer submits the sheet to a teller at a counter together with cash, securities, a seal, a bank book, a bank card, or the like. The teller will accept the transaction or not. Upon acceptance, the teller will operate a terminal to complete the transaction. With this prior art, the paperwork is primarily carried out on the basis of the one transaction sheet for one transaction, and the transaction is not a customer oriented transaction, but rather a type oriented transaction. In a case where a customer desires a plurality of different type transactions (for example, a deposit and a part of the deposit to be withdrawn), the customer had to submit a separate transaction sheet for each of the transaction types at a counter, for example a deposit counter and separately at a transfer counter. In addition, due to using the sheets, an accurate inspection of the type of sheets, storing of the sheets, and management of the sheets over a legally restricted period is a great burden on the institution.

To the contrary, according to the disclosure of Japanese Patent Laid-Open No. 62-237572, there is a system in which a customer orally informs a teller about the content of the desired transaction, the teller operates a terminal for inputting the contents of the transaction, performs the giving or acceptance of securities, and thereby performs the transaction without using any transaction sheet. In this type of banking, the customer specifies the content of the transaction orally to the teller and the teller inputs the content of the transaction to an input device. Valuable goods are given or accepted between the customer and the teller with respect to the specified content of the transaction, confirmed and stored. All of these procedures are performed simultaneously at one counter. Therefore, the burden of processing on tellers is heavy and the processing times are long, causing confused states at the counters.

SUMMARY

It is an object of the present invention to solve the above mentioned problems by providing a customer oriented banking system.

In order to specify the content of a transaction in the prior art, the valuable goods to be given are accepted between the customer and a teller at the time of specifying the transaction. Even in the case of a transaction system capable of performing multiple-item transactions, there is a problem that specifying the transaction without valuable goods cannot be carried out, that is, the customer must first submit or deposit the valuable goods. In addition, in the case that the valuable goods brought to a bank with a customer are temporarily stored at the bank and then a banking processing type is specified (for example deposit, transfer, payment and the like), there is another problem that specifying the transaction cannot be carried out unless the valuable goods are actually exchanged for cash at once at a counter.

It is an object of this invention to shorten inner-bank waiting times for the customer and eliminate confusing work at the counter by decreasing the burden of the tellers. The giving or acceptance of securities is not easy to perform by a machine and the burden of issuing official receipts, that is transaction sheets, performed by the tellers are problem areas to be eliminated with the present invention, by automatically performing a plurality of transactions without using any transaction sheets.

It is another object of the present invention to provide for processing a transaction in which expensive cash dispensers dealing with securities are efficiently operated and an amount of the investment for all of the equipment required for performing the transaction is restricted to a low value.

It is a further object of the invention to provide for the performance of transactions in which even if the valuable goods required for the transaction are not presently at hand or a balance of the account is lacking (hereinafter called a case in which there is no financial evidence), the content of the transaction can be specified in the same manner as that in which there is a presence of goods required for the transaction or a sufficient amount of balance in the account (hereinafter called a case in which there is financial evidence), and further a predetermined transaction is executed and completed at a later time when financial evidence is established.

Another object of the present invention is to perform a transaction in which cash and securities are accepted without specifying the content of the transaction, they are temporarily stored in a specified account such as a special deposit or temporary recording area and thereafter processing of the transaction for the acceptance of the amount can be specified without changing the securities into cash at a counter.

In order to accomplish the above objects, there is a procedure for performing a transaction by specifying the content of the transaction by the user and a procedure for accepting or giving securities (valuable goods) relating to the content of the transaction, wherein the specifying of the transaction and the dealing with the securities are separated at different locations. In order to accomplish this, according to the present invention, the system is constituted preferably by (1) a terminal for specifying the transaction, (2) a terminal for dealing with valuable goods, and (3) media for identifying customers.

(1) The terminal for specifying the transaction performs:
  (a) inputting of identification information such as a content of the transaction for the subject confirmation,
  (b) displaying of the inputted contents of the transaction,
  (c) printing the content of the transaction,
  (d) reading and writing the content recorded on a medium for identifying the customer,
  (e) specifying a user by using information recorded on a medium for identifying the customer that is to be held by the user or input information for confirming the subject,
  (f) issuing a medium for identifying a customer having information for identifying the customer to a customer having no medium for identifying the customer,
  (g) judging an executability of the transaction, (h) providing guidance to instruct a customer as to which device or counter they should go to in order to complete the transaction, and (i) providing communication with a host computer or other devices within the banking system.

(2) The terminal for dealing with valuable goods performs the functions of:

(a) taking in or paying out securities, (b) indicating and inputting an amount of or dispensing with respect to the content of securities, (c) displaying the amount or content of the transaction for the securities, (d) printing a content of the transaction and the amount of the transaction with respect to the securities as a receipt for the securities, (e) reading or writing a storage medium for identifying the customer, (f) specifying a user by using information recorded in the medium for identifying the customer that is to be held by a customer or input information for use in confirming the subject, (g) issuing a medium for identifying a customer having information for identifying the customer recorded thereon to a customer having no medium for identifying, (h) judging the executability of a transaction, (i) providing guidance and instruction to the customer as to what device or counter that the customer should go to next in order to complete the transaction, and (j) providing communication with the host computer or other devices within the banking system.

(3) The medium for identifying a customer for confirming the identity of the customer is used with respect to operating both of the above-mentioned terminals, and has been described to a great extent above.

Terminals for specifying the transaction and/or dealing with valuable goods are provided with a valuable goods acceptance confirmation key indicating that the valuable goods are accepted through a person with respect to an acceptance of securities that are not easy to confirm by machine, such as a voucher or postage stamps or the like, so that in such difficult cases a teller can be present for the securities transaction although not present for the normal securities transactions.

Both terminals for specifying the transaction and dealing with valuable goods compares a total amount of the transaction specified by the terminal with a balance of the transaction (a total of an amount inserted into the terminal for dealing with valuable goods and a balance remaining in an account, such as, a balance of deposit and the like) without having any relation with an order to utilize each of these terminals. Both of these terminals then judge an executability of the transaction based upon such comparison and separate the transactions into a list of an executable transaction that can be executed just after specifying the transaction and a separate list of a halted transaction. The list of an executable transaction is communicated to the host computer to execute and thereby complete the transaction. The list of a halted transaction is collected at regular time units or irregular time units and assembled into a file of halted transactions. With respect to the list of a halted transaction utilizing an account with a lack of balance as a financial resource, a computer determines if the balance of the account is varied due to a transaction of money at a later date, that is it checks whether the transaction can be executed or not at a later date, and further it determines whether the balance is satisfied before performing the transaction. Thus, at a later time if one of the halted transactions can be performed due to the increase in available funds, for example by a subsequent deposit or transfer, the transaction is then executed automatically.

In addition, the list of halted transactions that are not capable of instant execution in a computer for storing the balance of the account, can be collected for all of the terminals at the business location. Then if desired, at intervals, such list of halted transactions are collected from the various business locations and assembled over a network, such as a LAN or VAN, among the terminals placed within a region that manages the various business locations.

When a customer specifies the contents of at least one transaction by using a terminal for specifying the transaction and receives the medium for identifying a customer, the customer then enters the medium for identifying the customer and enters securities, if needed, into a separate terminal for dealing with valuable goods to complete the transaction. It is also applicable that the terminal for dealing with valuable goods is utilized in advance to receive a medium for identifying a customer, and then the medium for identifying the customer is inserted into a separate terminal for specifying the transaction to specify the content of the transaction. In the case that securities such as stamps or vouchers are not easy to be confirmed by a machine or in the case that a stamp providing acceptance such as an auto tax receipt is required later, for a motor vehicle inspection, the terminal for specifying the transaction or terminal for dealing with valuable goods may be provided with a valuable goods acceptance confirmation key to be operated only by a teller when the valuable goods are received through a teller.

The medium for identifying a customer is utilized for providing correspondence between the customer operating the terminal for specifying the transaction with the customer utilizing the terminal for dealing with valuable goods for the content of the transaction. The terminal for specifying the transaction and the separate terminal for dealing with valuable goods each read the identification information from the medium for identifying a customer. In case the information is needed and the medium for identifying a customer is not inserted, a new medium for identifying a customer is issued. In this case, the use may be identified with reference to a bank card and the like. In addition, the bank card may be used as a medium for identifying a customer by using an integrated circuit (IC) card and the like, and then information such as a balance of an account as well as the specified content of the transaction may be recorded on the medium. Since a medium for identifying a customer having information uniquely identifying the user or customer may be provided at or provided to each of the terminals, it becomes possible to provide a correspondence between the terminals for a customer specifying a content of a transaction and another authorized person using the medium with respect to the giving or receiving of valuable goods through the terminal for specifying a transaction. It is also possible to confirm the identity of the users of both terminals without using any physical medium for identifying the customer, by using a personal identification number such as a password and other electronically based automatic type identification means.

The terminal for dealing with valuable goods or the terminal for specifying the transaction may be provided with instructions to the customer relating to a specified account such as a special deposit or a temporary deposit account used for keeping a transaction source, and thereby an amount of money fed to the terminal for dealing valuable goods is stored temporarily in a specified account such as a special deposit account and thus the content of the transaction can be specified later with respect to the account as a financial source. As a result, it becomes possible to accept the valuable goods independently of the prior or subsequent specifying of a content of the transaction.

The content of the transaction inputting through a terminal for specifying the transaction is instantly executed if the transaction has sufficient related financial evidence (for example as a financial source, a savings deposit may be specified and the balance of the deposit is satisfied for executing transaction). In turn, in the case that there is no financial evidence (including insufficient financial evidence), (for example, where the cash is selected as a transaction financial source and the cash is not deposited yet or a balance of the deposit selected as a financial source is lacking in sufficient amount) an execution of the transaction is temporarily halted and the content of the halted transaction is stored in a file of halted transactions. The halted transaction is executed if cash selected as the financial source is deposited through a counter or deposit account specified as a financial source in sufficient amount to provide a balance for executing the transaction to the deposit or transfer of money. The execution time for the transaction through money depositing at a time when cash or securities are accepted or at a time the teller accepts securities and depresses the valuable goods acceptance confirmation key in the current terminal for dealing the valuable goods is quite short. Data relating to a transaction financial source is stored in a file of halted transactions; the information is checked when the balance of the deposit account is renewed by a deposit or transfer, that is when it changes, and with respect to such checking, execution of the halted transaction is judged as to whether it can now be carried out. Thereby, when the financial resources relating to a halted execution are changed and judged to now be sufficient, the halted transaction is automatically executed. In view of this fact, it is then possible to specify the transaction without having any financial evidence.

BRIEF DESCRIPTION OF THE DRAWING

Further objects, features and advantages of the present invention will become more clear from the following detailed description of a preferred embodiment, with respect to the drawings, wherein:

FIG. 5 shows a balance list in a file of deposit balances;

FIG. 8 is a flow chart relating to a terminal for specifying a transaction making separate lists of an executable transaction and a halted transaction;

FIGS. 9(a), (b) and (c) show balance lists;

FIG. 16 is an example of a list of a transaction;

FIG. 17 is an example of a list of a halted transactions;

FIG. 18 is an example of a balance list; and

FIGS. 24(a)-(d) relate to a balance list;

FIG. 25 shows an example of a list of a deposit balance;

FIG. 26 is an example of a list of a transaction;

FIGS. 27(a) and (b) are examples of a list of an executable transaction;

FIG. 28 is an example of a list of a halted transactions;

FIG. 29 is an example of a list of the delivery of valuable goods;

FIG. 30 is an example of a list of an executable transaction;

FIG. 31 is an example of a list of a halted transactions;

FIG. 32 is an example of a list of a transaction; and

FIG. 33 is an example of a list of an executable transaction.

DETAILED DESCRIPTION

Figure 1:
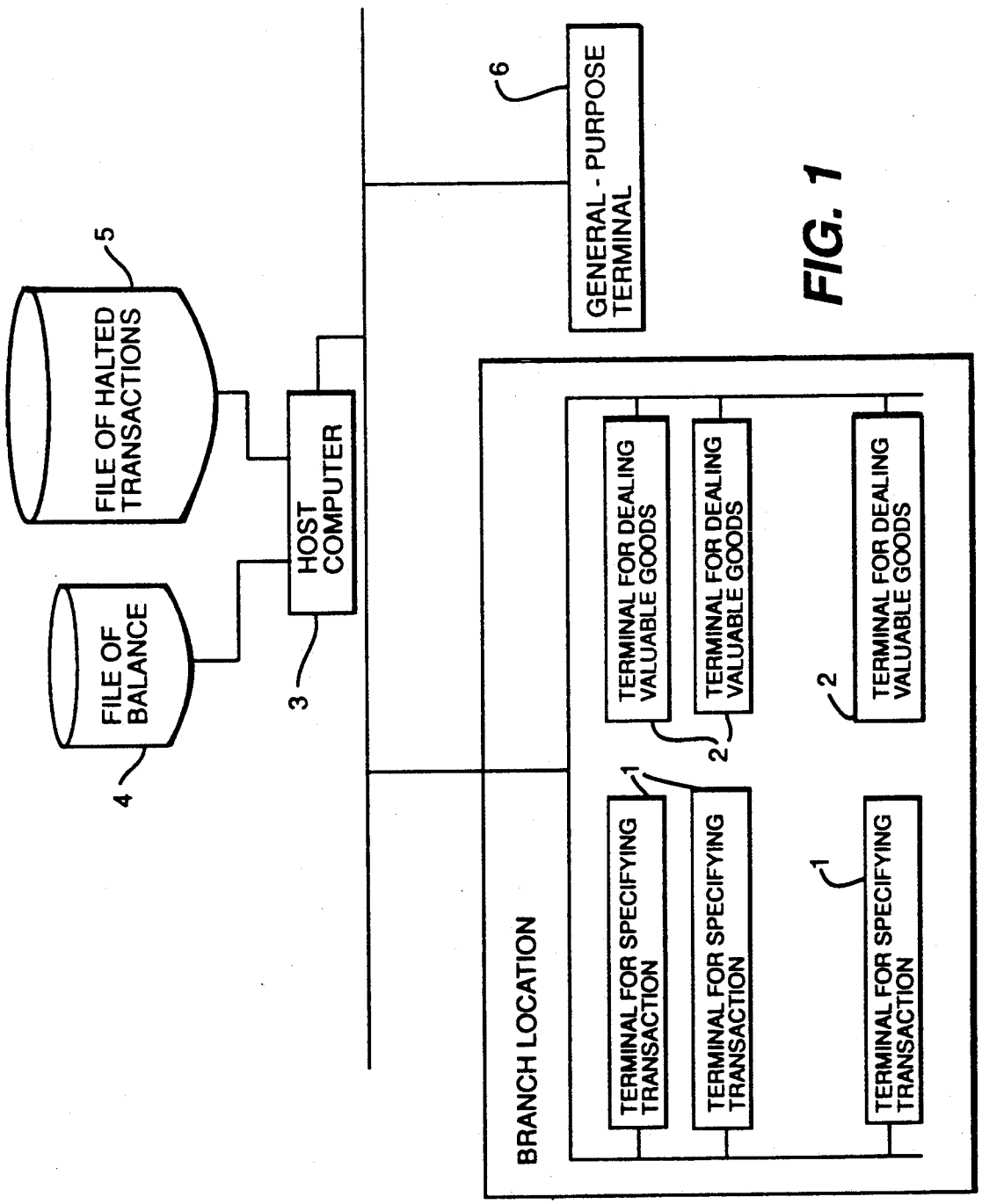
FIG. 1 is a schematic illustration of a transaction system in accordance with the present invention.

Referring now to the drawings, a preferred embodiment of this invention will be described.

FIG. 1 is a schematic illustration for showing a configuration of hardware of this invention. In this figure, reference numeral 1 denotes a terminal for specifying a transaction, 2 a terminal for dealing valuable goods, 3 a host computer, 4 a file of balance of deposit, 5 a file of halted transactions, and 6 a general-purpose terminal. Each of the terminals 1, 2 and 6 and the host computer 3 is connected with the others through a communication line. External memory devices such as the file 4 of balance of deposit and the file 5 for halted transactions may also be connected to the host computer 3.

Figure 2:
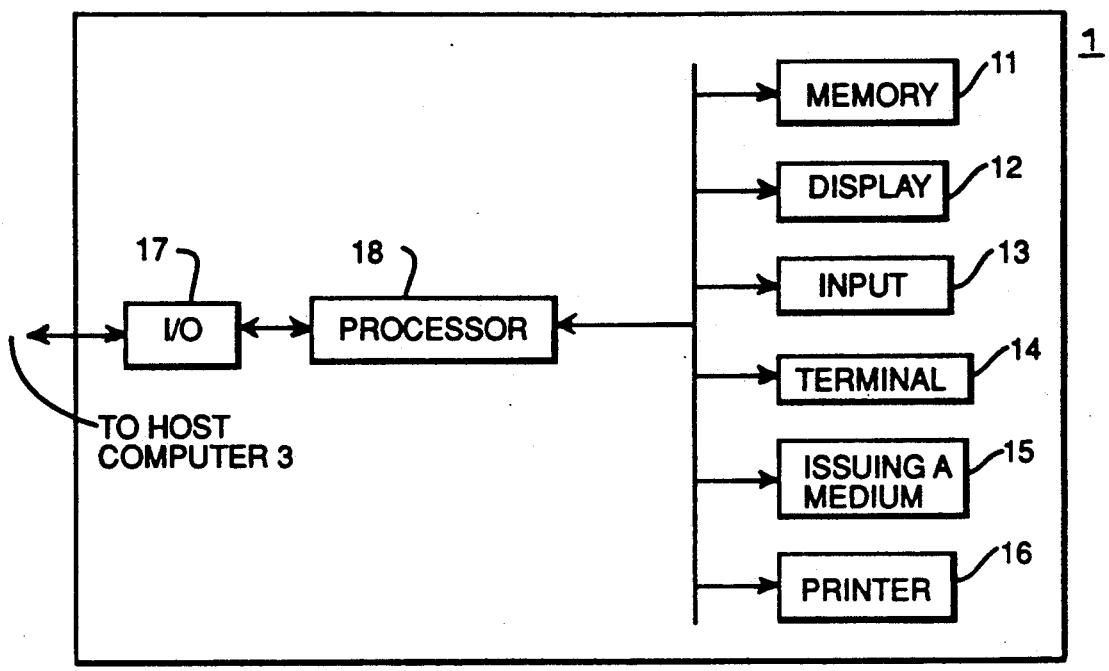
FIG. 2 schematically shows the arrangement of hardware for a terminal specifying a transaction.

FIG. 2 shows a configuration of hardware of the terminal 1 for specifying a transaction. In this figure, reference numeral 11 denotes a memory device, 12 a displaying device, 13 an input device, 14 a terminal for identifying a customer, 15 an issuing device for a medium for identifying a customer, 16 a printing device, 17 a communication device, and 18 a processing device for controlling each of the terminals above and for processing transaction data.

Figure 3:
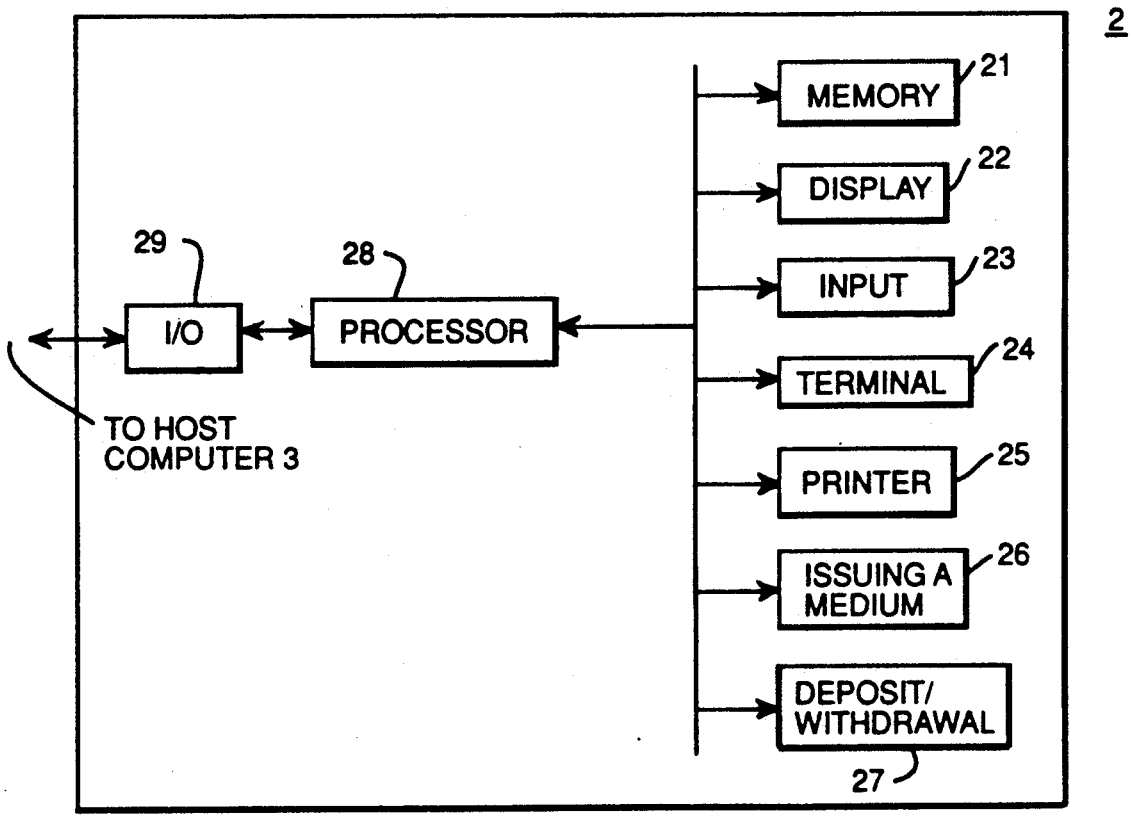
FIG. 3 shows the configuration of the hardware for a terminal dealing with valuable goods.

FIG. 3 shows a configuration of the terminal 2 for dealing valuable goods, wherein a reference numeral 21 denotes a memory device, 22 a displaying device, 23 an input device, 24 a terminal for identifying a customer, 25 a printing device, 26 an issuing device for a medium for identifying a customer, 27 a depositing or withdrawal device, 28 a processing device and 29 a communication device. Operation of each of these devices will be described practically in reference to the type of transaction.

Figure 4:
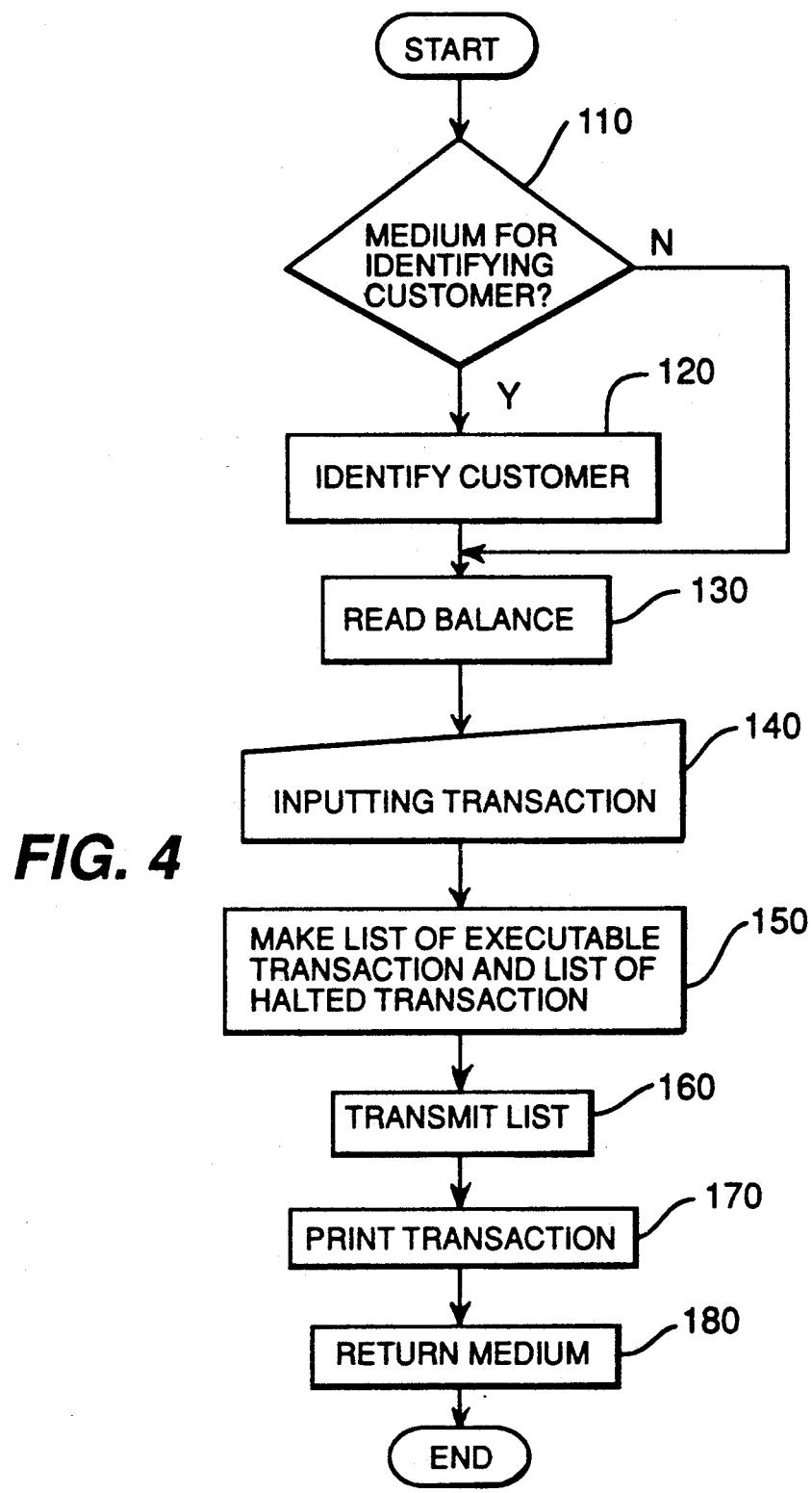
FIG. 4 is a flow chart showing the processing at the terminal for specifying the transaction.

(a) An example relating to a savings deposit and transferring:

A case in which a customer may deposit 50,000 yen in a savings deposit will be described. FIG. 4 is a flow chart for showing processing of the terminal 1 for specifying a transaction. A customer may input in the input device 13 whether the customer holds a memory medium for identifying a customer issued by a bank or not (step 110). A menu or an operating order is displayed on the displaying device 12 to provide information for supporting a transaction inputting operation of the customer for the input device 13. The customer may touch a touch panel of the input device 13 corresponding to a selection branch of the menu to perform an inputting operation. In case that the customer already holds a medium for identifying a customer, it is inserted into the terminal 14 for identifying a customer. If the customer has not such a medium, a bank deposit card is inserted into the terminal 14 for identifying a customer and then information such as an input of an identification number and the like is inputted from the input device 13. The terminal 14 for identifying a customer may read information for identifying a customer (for example, a customer identification number) from a medium for identifying a customer or a bank deposit card, store its information in the memory device 11 and carry out a processing for identifying a customer (for example, an identification number inputted is transmitted to the host computer for collating its number) (step 120). A balance of deposit of that customer is read from a file 4 of balance of deposit through the host computer 3 and then it is stored in the memory device 11 (step 130).

FIG. 5 shows a list of balance 50 in the file 4 of the balance of deposit.

The list of balance 50 is composed of a customer identification number, an account type, an account number, a branch number, a balance, a maturity date, a flag and other columns. The branch number is a branch number of the account number. The flag will be described later. An inputting operation supporting process of the input device 13 may utilize information relating to the account held by the customer when a menu selection is made and the account type not held by the customer on the menu will not be displayed.

Figures 6, 7:
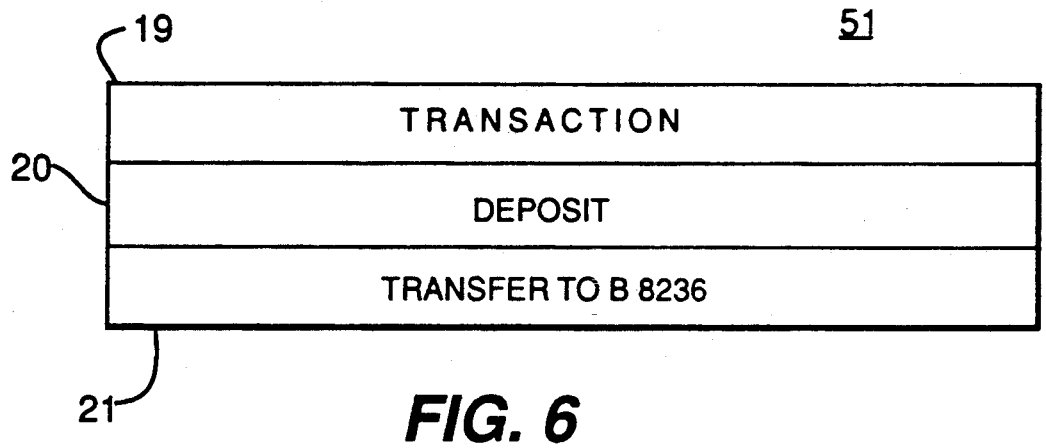
FIG. 6 shows a list of a transaction.
FIG. 7 shows a list of a halted transaction.

(a-1) A case that the medium for identifying a customer is not held: In this case, it is assumed that the customer identification number is "0001". When the bank card is inserted into the terminal for identifying a customer 14, a menu of transaction items is displayed on the displaying device 12 (step 140). As the transaction items, there are "deposit", "payment", "cancellation", "payment of public fees", "payment of tax", and "exchanging goods for cash" and the like. If "deposit" is selected, the menu of the type of account is displayed and then "savings deposit" (it is assumed that a present balance is 100,000 yen). If the customer has no savings deposit account, a menu for selecting the type of account is not displayed and a menu for selecting a financial source for deposit will be displayed. Then the customer selects "deposit of cash", "deposit of special securities" or other accounts already opened such as "special deposit". If "cash deposit" is selected, an instruction is made for inputting the deposit amount and then numeric keys are displayed on a screen. If "50,000 yen" is inputted, a menu for asking presence or absence of the next transaction item is displayed. If "transferring" is selected, an instruction for inputting a transferred amount, a transferring party and a financial source and the like is provided as an output, and further numbers, character keys or a past list of transferred parties are displayed on the screen. If it is input that the transferred amount is "150,000 yen", a name of transferred bank is "B", a transferred account number is "8236" and a financial source is "savings deposit", a menu for asking a presence or absence of the next transaction item is displayed. Since in the example, there is no other transaction, "absence" is selected and an inputting operation for a content of the transaction will be terminated. The inputted content of transaction is stored in the memory device 11 as a list of content of transaction (FIG. 6). The above-mentioned series of inputting processes are carried out by a step 140. The processing device 18 may classify the list of a content of transaction 51 into an executable transaction having financial evidence or a halted transaction having no financial evidence, and then make a list of executable transactions and a list of halted transactions 52 (FIG. 7) (step 150).

FIG. 8 is a flow-chart for illustrating a program for making a list of executable transactions and a list of halted transaction 52. The variable N is set to one indicating a column of a list 51 of a content of transaction (step 200). A list 80 of balance (FIG. 9(a)) is utilized and the type of account of the N-th item in the list 51 of a content of transaction is converted into an account number (step 210). In this example, "savings deposit" is converted into an account number "1001". A standard of classification of executable transaction corresponds to the fact that the content of transaction has no delivery of valuable goods at a counter (step 220) and a balance of deposit of a financial source for transaction is higher than an amount required for performing a transaction (step 230) and other transactions are classified as halted transactions. The content of transaction in this example is a depositing and a transferring for a savings account and the content of transaction contains a depositing procedure performed at a counter. Thus, the list of executable transaction is vacant, a condition part of the list 52 of a halted transaction has a procedure of "a delivering 50,000 yen at a counter" and a transaction part contains a procedure of "for 1001, plus 50,000 yen" (step 260). Then, N is incremented (step 270). Since the transaction of N=2 is a transaction of transfer with a savings deposit being applied as a financial source, there is no acceptance or giving of valuable goods (step 220). Since a balance of a savings deposit which is a financial source of this transaction is 100,000 yen, it is lower than a transaction amount of 150,000 yen indicated in a column of N=2 in the list 51 of a content of transaction (step 230). Accordingly, this transaction is also added to the list 52 of halted transactions (step 260).

As shown in FIG. 7, an item of "balance of 1001'−150,000 yen" enters a condition part of the list 52 of halted transactions and further the content of transaction has an item of "for 1001, minus 150,000 yen" and another item of "setting a bank B 8236 to +150,000 yen". As N is further incremented (step 270), a transaction of N=3 is not present in the list 51 of a content of transaction (step 280), so that the list of an executable transaction is arranged for every account number (step 290). Since the list of an executable transaction in this example is vacant, no processing is carried out. With the foregoing arrangement, the list of an executable transaction and the list 52 of a halted transactions are finished.

In case that there is no acceptance or giving of valuable goods in the transaction of the list 51 of a content of transaction and there is a transaction having a relation "amount of transaction—source of transaction", this transaction is added to a list of executable transactions in the memory device 11 (step 240) to revise a list of balance in the memory device 11 (step 250). In this case, a word of revision or renewal means that it is revised to a new balance generated as a result of execution of the above-mentioned executable transaction.

The list 52 of halted transactions is transmitted to the host computer 3 together with an identification number of a customer (step 160). The host computer 3 may affix the identification number of a customer "0001" as a retrieval key and then the list 52 of a halted transaction is stored in a file 5 of halted transactions connected to the host computer 3. Lastly, the terminal for specifying a transaction may print a content of transaction with a printer device 16 (step 170), issue a medium for identifying a customer (step 180), return the bank card, and then complete a transaction specifying processing. Then, a customer may insert a medium for identifying a customer into a device 24 for identifying a customer of the terminal 2 for dealing valuable goods. In addition, cash of 50,000 yen is inserted into the cash inserting and ejecting device 27.

Figure 10:
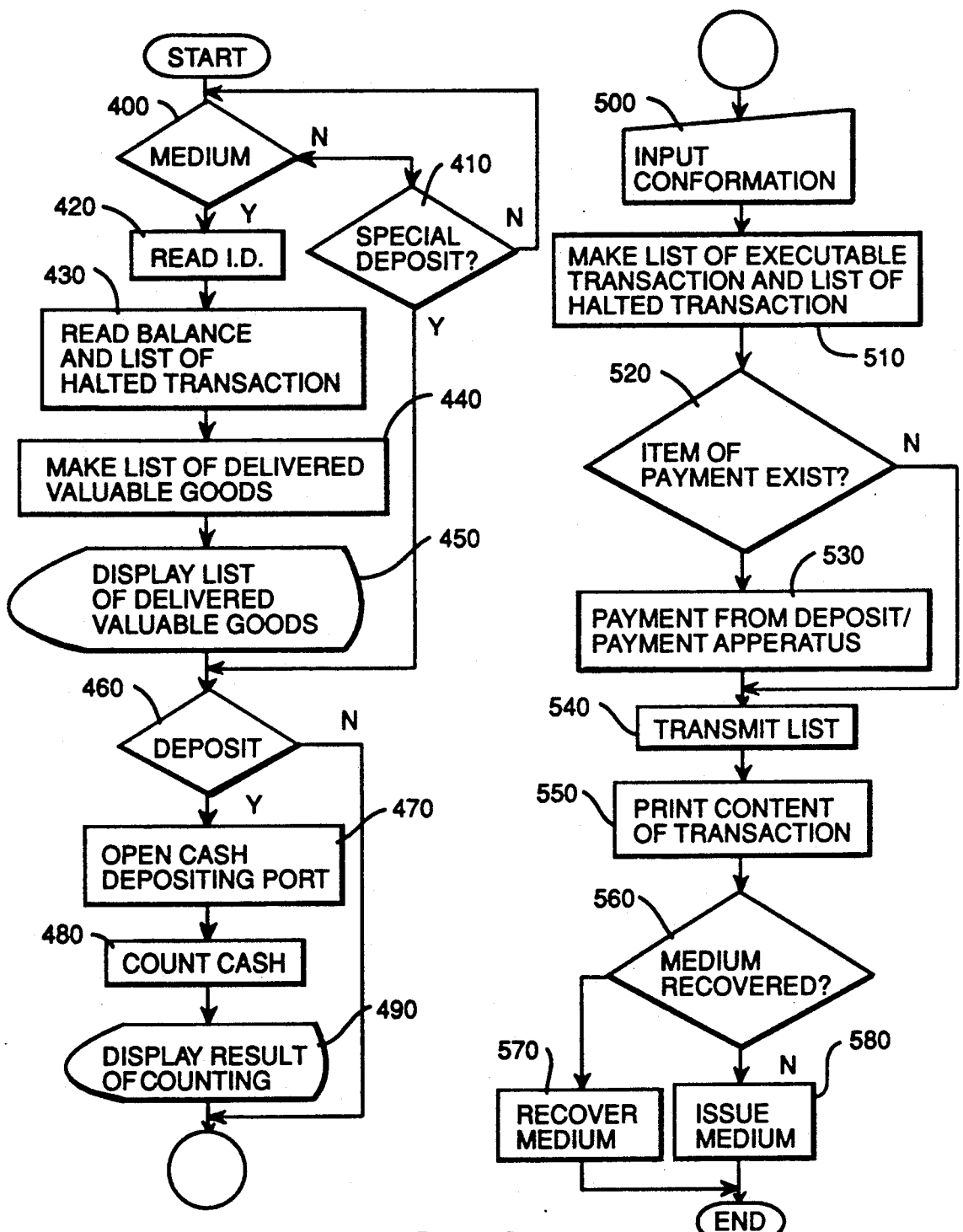
FIG. 10 is a general flow chart for the processing at the terminal for dealing with valuable goods.

FIG. 10 is a flow-chart for expressing a program for the terminal device for dealing valuable goods. A customer may insert a medium for identifying a customer into the device 24 for identifying a customer (step 400). The device for identifying a customer 24 may read a customer identification number from the medium for identifying a customer (step 420). The processing device 28 may request a transmittance of the list 52 of a halted transaction corresponding to the read identification number "0001" and the list of balance 80 through a communication device 29. The host computer 3 may retrieve the list 52 of a halted transaction corresponding to the customer identification number "0001" from the file 5 of halted transactions. The list of balance 80 corresponding to the customer identification number "0001" is retrieved from the file 4 of balance of deposit. The retrieved list 52 of a halted transaction and the balance list 80 are transmitted to the terminal 2 for dealing valuable goods. The terminal 2 for dealing valuable goods may store two types of lists received (step 430). The processing device 28 may make a list of valuable goods to be accepted or given at a counter (hereinafter called a list of accepted or received valuable goods) from the list 52 of a halted transaction (step 440) and display it to a displaying device 22 (step 450). In this example, an item of "depositing of cash of 50,000 yen at counter" indicated at a condition part in FIG. 7, becomes a content of a list of valuable goods to be accepted or given. In case that there is an item of depositing of cash in the list of valuable goods (step 460), the processing device 28 may instruct the cash inserting or ejecting device 27 to open a cash insertion port (step 470), so that a customer may insert cash into an insertion port (step 470). The cash inserting or ejecting device 27 may count cash (step 480) and display its result in the displaying device 22 (step 490). The customer may check whether the inserted valuable goods is coincident with the displayed content (step 500). In this case, since the inserted valuable goods fulfills the content of the list of delivered cash, a depositing and a transferring are carried out as a transaction.

Figure 11:
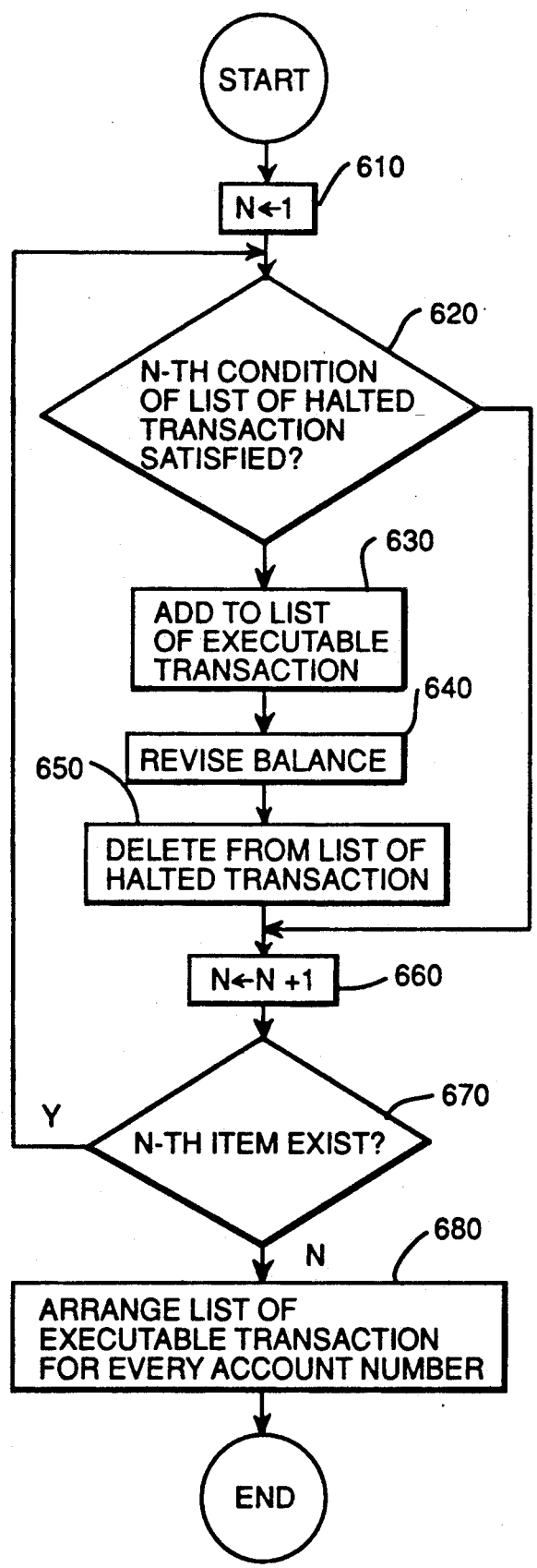
FIG. 11 is a flow chart of the processing at the terminal dealing with valuable goods for making lists of an executable transaction and a halted transaction.

FIG. 11 is a flow-chart for expressing a program in which the terminal 2 for dealing valuable goods may make a list of an executable transaction and a list of a halted transaction. A pointer for indicating a column in the list is initialized (step 610). Upon insertion and confirmation of the valuable goods, an item of "delivering of 50,000 yen" of a condition part of the list 52 of a halted transaction is satisfactory (step 620), so that an item of "for 1001, plus 50,000 yen" is stored in the memory device 21 as a list of an executable transaction (step 630). The balance list 80 in the memory device 21 is revised (step 640), the halted transaction within the memory device 21 is deleted (step 650) and N is incremented (step 660).

FIG. 9 (b) shows a balance list 81 after revision. A condition part of a transaction is satisfactory due to a fact that a balance of 1001 becomes 150,000 yen (step 620), so that an item of "for 1001, minus 150,000 yen" and another item of "for bank B 8236, plus 150,000 yen" in the content of transaction are added to the list of executable transactions (step 630). Then, the balance list is revised and a balance of 1001 is set to 0 (step 640). FIG. 9 (c) is the balance sheet 82 after its revision. A transaction of N=2 is deleted from the list 52 of halted transactions (step 650) and N is incremented (step 660). Since the transaction of N=3 is not present in the list of transactions, the list of an executable transaction is arranged for every account number (step 680). In this example, "for 1001, plus 50,000" and "for 1001, minus 150,000 yen" are arranged as "For 1001, minus 100,000 yen". With the foregoing, the list of an executable transaction and the list of a halted transaction are completely made.

Figure 12:
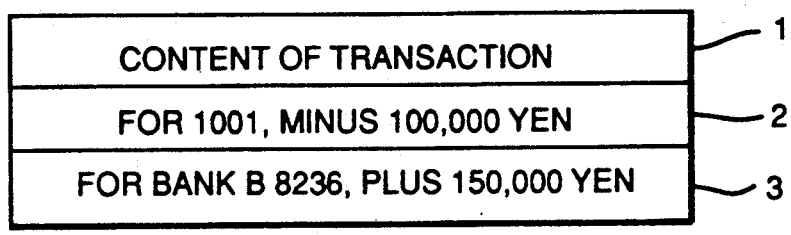
FIG. 12 shows an example of a list of an executable transaction.

FIG. 12 shows a list 53 of executable transactions.

The processing device 28 may withdraw cash from the money inserting and ejecting device 27 (step 530) if there is an item (step 520) and may transmit a request for deleting the list 52 for a halted transaction corresponding to the customer identification number from the file of halted transactions 5 and place it in the list 53 of an executable transaction 53 to the host computer 3 (step 540). The host computer 3 decreases the balance of savings account of a customer (account number 1001) by 100,000 yen in correspondence with a content of the received list of the executable transactions and increases the balance of a bank B 8236 by 150,000 yen. After this operation, a notification of a completion of the execution of transaction is sent to the terminal 2 for dealing valuable goods. As the terminal 2 for dealing valuable goods may receive a notification of a completion of transaction, it may print a content of transaction with a printing device 25 (step 550), take a medium for identifying a customer (steps 560 and 570) and finish the processing. Lastly, the customer may receive the printed matter.

(a-2) Case that a medium for identifying a customer is already held:

(a) We describe the case where a medium for identifying a customer is inserted into the terminal 1 for specifying a transaction after feeding cash of 50.000 yen to the terminal 2 for dealing valuable goods.

As the medium for identifying a customer is inserted into the customer identification device 14, a menu of items of transaction is displayed at the displaying device 12. As the transaction items, there are "depositing", "payment", "transferring", "cancellation", "payment of public utility charge", "paying of tax" and "exchange of valuable goods for cash" and the like. If "depositing" is selected, a menu of the type of account is displayed and "savings deposit" is selected (it is assumed that a present balance is 100,000 yen). In case that a customer has a savings deposit account only, a menu for selecting the type of account is not displayed, but a menu for selecting a next selection item will be displayed. Since cash (50,000 yen) is already deposited from the terminal 2 for dealing valuable goods, an instruction to input the deposit amount is provided as an output and then a numerical key will be displayed on a screen of the displaying device 12. If "50,000 yen" is inputted, a menu for asking a presence or an absence of a next item of transaction will be displayed. If "transferring" is selected, an instruction to input a transferred amount, a transferred party and a financial source and the like is made, and the numerical or character keys or a past list of transferred parties will be displayed. If "150,000 yen" for the transferred amount, "B" for the transferred bank name, "8236 " for the transferred account number and "savings deposit" for the financial source and the like are inputted, a menu for asking presence or absence of the next item of transaction will be displayed. In this example, there is no other transaction, "absence" will be selected and an inputting action for the content of transaction will be finished. The inputted content of transaction will be stored in the memory device 11 as a list of content of transaction. The processing device 18 may classify the list of transaction into an executable transaction having a financial evidence or a halted transaction having no financial evidence as a transaction source and then make a list of executable transactions and a list of halted transactions.

FIG. 8 shows a flow-chart for expressing an order for making a list of an executable transaction and a list of a halted transaction. A content of transaction in this example is a depositing for a savings account and a transferring that has a financial evidence, so that a condition part in the list of a halted transaction is "a waiting to specify a content of transaction". In the list of an executable transaction are entered "for 1001, plus 50,000 yen", "for 1001, minus 150,000 yen" and "for bank B 8236, plus 150,000 yen". In this case, 1001 is the saving deposit account number of a customer and the balance list 80 is utilized to convert "savings deposit" into "1001". When the content of transaction having a financial evidence of financial source is confirmed, the condition part of "waiting of specifying a content of transaction" in the list of a halted transaction is fulfilled. Then, "for 1001, plus 50,000 yen", "for 1001, minus 100,000" and "for bank B 8236, plus 150,000 yen" are stored in the memory device 21 as the list of an executable transaction. Since the list of halted transactions is null, the list of executable transactions will be arranged for every account number. The processing device 28 may transmit a request for deleting the list of a halted transaction of the customer identification number from the file of halted transactions 5 and the list of an executable transaction to the host computer 3. The host computer 3 may reduce the balance of the savings deposit of a customer (account number 1001) in response to a content of the list of executable transactions and may send a notification of a completion of execution of transaction to the terminal 1 for specifying a transaction. The terminal 1 for specifying a transaction receives a notification of a completion of the transaction, prints a content of transaction with a printing device 16 and then may complete the processing by taking a medium for identifying a customer. Lastly, the customer may receive the printed matter.

With the foregoing description, it is not necessary to provide any teller for a procedure for specifying transaction, so that a burden of the teller may be reduced.

Figure 13:
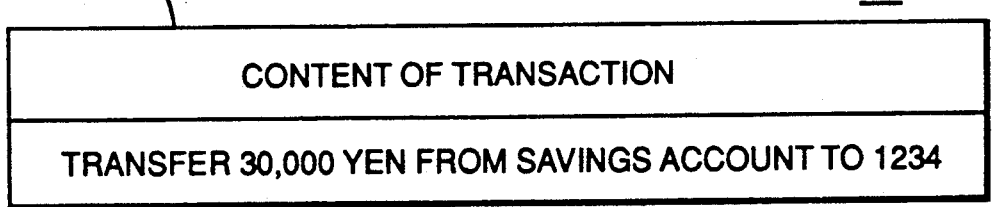
FIG. 13 is an example of a balance list.
Figure 14:
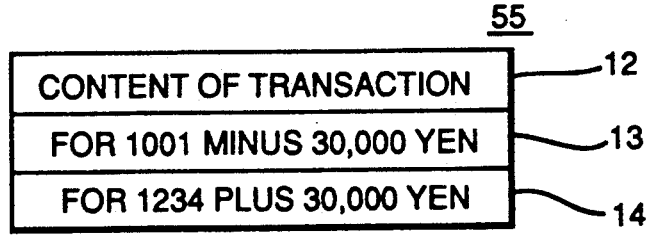
FIG. 14 is an example of a list of a transaction.

(b) An example in which a transferring is carried out for another account with the savings deposit account being a financial source:

There will be described a case in which a savings deposit account (account number 1002) is applied as a financial source and 30,000 yen is transferred to another account (a customer identification number 0123, account number 1234). The balance of deposit in the account 1002 is 100,000 yen and the account 1234 has a balance of 15,000 yen. In an initial menu of the input device 13 of the terminal 1 for specifying transaction, a customer may select an item of "having no" medium for identifying a customer of a transaction bank (step 110), and then a bank deposit card is inserted. Further, as information required for identifying a customer is inputted, the customer identifying device 14 may read the customer identifying number from this bank deposit card, store the read number in the memory device 11, and perform a processing for identifying the customer (step 120). The processing device 18 may read the balance list 83 (FIG. 13) of this customer from the deposit balance file 4 through the host computer 3 and store it in the memory device 11 (step 130). FIG. 5 shows a balance list 50 in the deposit balance file 4. Then, the content of transaction will be inputted from the input device 13 by a customer (step 140). At first, "transferring" is selected as a transaction item and then as a financial source, "savings deposit" is selected. As the financial source for a transferring transaction, there are three items of "depositing", "savings deposit" and "special deposit". "30,000 yen" of a transferred amount is inputted and a transferred account number of "1234" will be inputted. In case of specifying a transferred party and the transferred party is another bank, and a name of bank will be selected through a menu. Lastly, "no" of the next transaction item will be inputted and then the inputting operation will be terminated. The inputted content of transaction is stored in the memory device 11 as the list 54 of content of transaction (FIG. 14).

Figure 15:
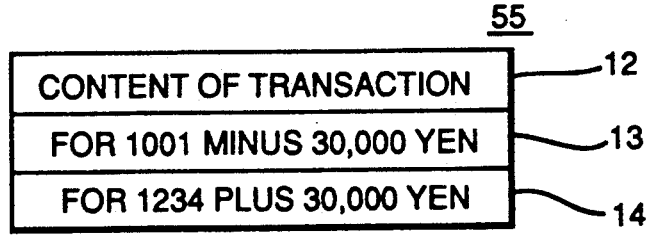
FIG. 15 is an example of a list of an executable transaction.

The processing device 18 compares the balance of savings deposit of a customer stored in the memory device of the terminal for specifying transaction (100,000 yen) with the content of the list of content of transaction 54 (transferring of 30,000 yen) (step 230) and then assures an executability of the transaction. In this example, since there is a relation "transferred amount (30,000 yen) is greater than a balance of a savings deposit (100,000 yen)", the processing device 18 judges that it is an executable transaction. With this arrangement, a list of an executable transaction 55 (FIG. 15) becomes "for 1002, minus 30,000 yen" and "for 1234, plus 30,000 yen" (step 240). Since there is no other transaction, the list of a halted transaction is vacant. The foregoing is a processing of the step 150. The executable transaction list 55 is sent to the host computer 3 (step 160) and it is utilized for revising the deposit balance file 4. The host computer 3 may send a completion of renewal to the terminal 1 for specifying transaction, print the content of transaction with the printer device 16 upon reception of it (step 170), return the bank deposit card (step 180) and complete the processing.

In case of this transaction, an acceptance or giving of valuable goods is not carried out, so that the transaction will be completed after the foregoing. If the terminal 1 for specifying transaction is placed outside of a bank, it is not necessary for a customer to go to a bank and then a confused state within the bank will be eliminated. In case that the terminal 1 for specifying transaction is placed at a department store, it is possible for a customer to perform the above-mentioned transaction while performing a shopping operation.

(c) An example relating to a depositing and a transferring through a special security (stamp):

There will be described a case in which a customer having no medium for identifying a customer of a transaction bank may bring a stamp to a counter to perform a transferring transaction. At an initial menu of the input device 13 of the terminal 1 for specifying transaction, an item "having no" medium for identifying a customer is selected by a customer. If the medium for identifying a customer is not inserted, but a bank deposit card is inserted into the customer identifying device 14, a menu of transaction will appear in an input screen. As the transaction items, there are "deposit", "withdrawal", "transferring", "cancellation", "paying of public changes", "tax payment", "exchange of valuable goods for cash" and the like. If "deposit" is selected, a menu showing the type of account will be displayed and "savings deposit" is selected (assuming a present balance is 300,000 yen). Then, a menu for selecting a financial source for use in depositing is displayed and it is selected whether "depositing in cash" or "depositing through special securities" or other already opened accounts such as "special deposit" is desired through the terminal 2 for dealing valuable goods. If an item of "depositing through special securities" is selected, an instruction to input a deposit amount is provided as an output and numeric keys are displayed on the screen. When "500,000 yen" is inputted, a menu for asking presence or absence of the next transaction item is displayed. When "transferring" is selected, an instruction for inputting a transferring amount, a transferred party or a financial source and the like is provided as an output and then a numerical key or a character key or a last list of transferred parties will be displayed on a screen. When the transferring amount "750,000 yen", the transferred party "B" and the financial source "savings deposit" are inputted in the same manner as that of the above-mentioned procedure, a menu for asking presence or absence of the next transaction item is displayed. In this example, there is no transaction, so that "absence" is selected and then an inputting operation for a content of transaction is finished. The inputted content of transaction is stored in the memory device 11 as the list 58 of content of transaction (FIG. 16).

The processing device 18 classifies the list 56 of the content of transaction into an executable transaction having a financial evidence or a halted transaction having no financial evidence to make a list of an executable transaction and a list of a halted transaction 57 (FIG. 17).

FIG. 8 is a flow-chart for expressing an order of making a list of an executable transaction and a list of a halted transaction. A reference of classification for the executable transaction includes no acceptance or giving of valuable goods at a counter and a balance of deposit acting as a financial source is higher than an amount required, and other items than this can be classified as a halted transaction. The content of transaction in this example is a deposit for a savings account, a transferring and then a depositing procedure at a counter, so that the list of executable transaction is vacant, the condition part of the first transaction in the list 57 of halted transaction has "500,000 yen delivered through securities" and further its part of the content of transaction has "for 1005, plus 500,000 yen". In addition, the condition part of the second transaction has a relation "balance of 1005>/=750,000 yen" and its part of transaction has "for 1005, minus 750,000" and "for bank C 3456, plus 750,000 yen". At this time, 1005 is a savings deposit account number of a customer and "savings deposit" is converted into "1005" by utilizing the balance list 3456 in the bank C as the bank of transferred party B and its account number and this is converted by utilizing a list of previous transferred parties of this customer.

The list 57 of halted transactions is transmitted to the host computer 3 together with a customer identification number. The host computer 3 stores the list 57 of a halted transaction into the file of halted transactions 5 connected to the host computer 3 with the customer identification number 0234 as a retrieval key. Lastly, the terminal 1 for specifying transaction may print the content of transaction with a printing device 16, issue a medium for identifying a customer, guide a customer to a teller at a counter of transaction of valuable goods and finish a processing for specifying a transaction.

Then, a customer delivers the medium for identifying a customer and 500,000 yen of a special securities to the teller. FIG. 10 is a flow-chart for expressing a general flow of a program for the terminal 2 for dealing valuable goods. A teller inserts the medium for identifying a customer into the device 24 for identifying a customer. The device 24 for identifying a customer reads a customer identification number from the customer identification medium, and its communication device 29 sends a request of transmittance of the list of halted transactions for the identification number, and the balance list to the host computer 3. The host computer 3 retrieves and extracts the list 57 of a halted transaction of its customer identification number 0234 from the file 5 of halted transactions, retrieves and extracts the balance list 84 of the customer identification number (FIG. 18) from the file 4 of deposit balance and sends it to the terminal 2 for dealing valuable goods. The terminal 2 for dealing valuable goods stores the list sent in the memory device 2. The control device 28 makes a list of valuable goods accepted or given at a counter in view of the list 57 of a halted transaction and displays it to the displaying device 22. In this example, "a delivering of 500,000 yen at a counter through a special securities" is a content of the list of the delivered valuable goods. Since this list of delivered valuable goods has a depositing item, a total amount of securities received from a customer is inputted by the teller. The teller confirms whether the content of valuable goods received from the customer is coincident with the content of the list of the delivered valuable goods or not and if the teller confirmed this fact, the teller pushes the valuable goods acceptance confirmation key at the input device 23.

Figure 19:
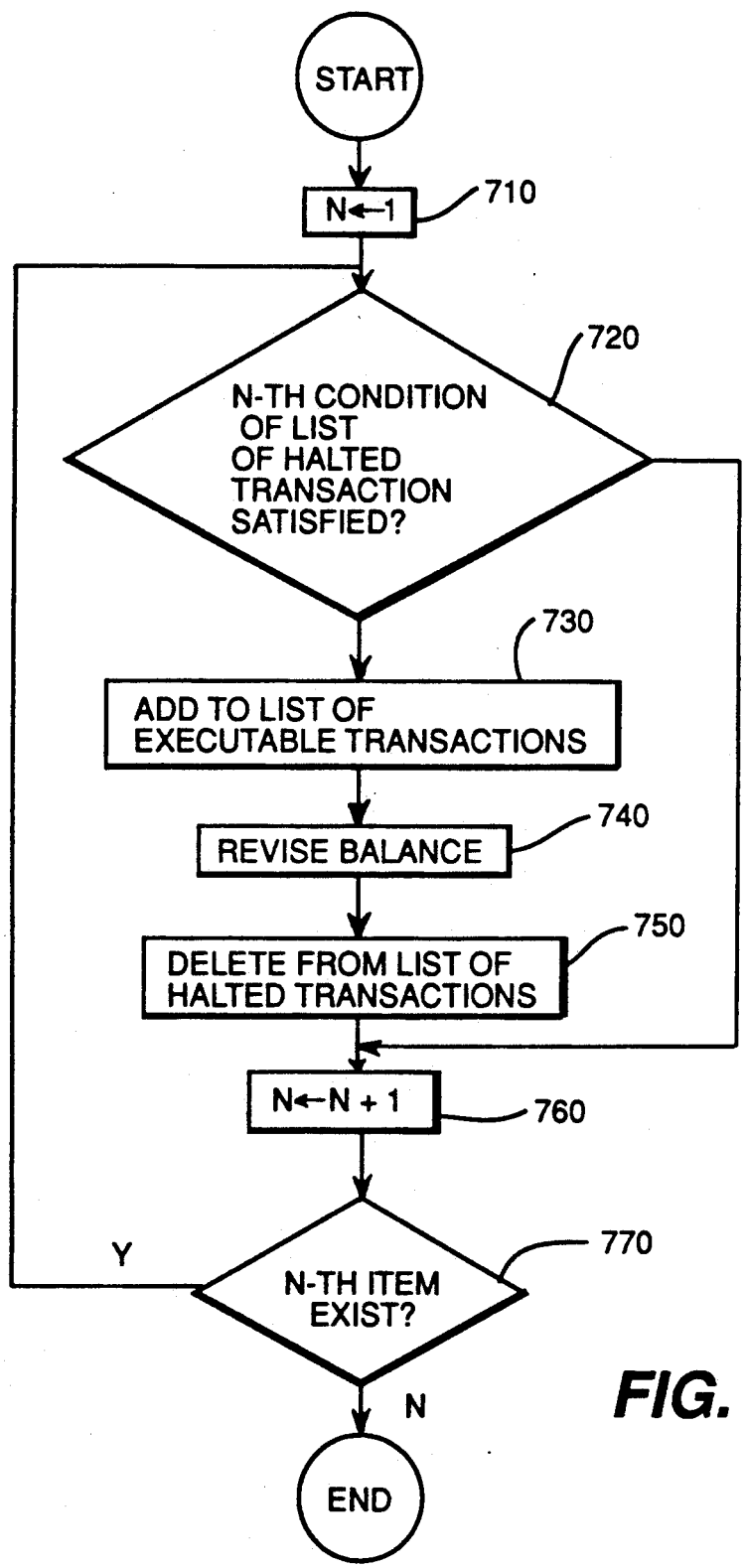
FIG. 19 is a flow chart relating to the processing at the terminal for dealing with valuable goods.
Figure 20:
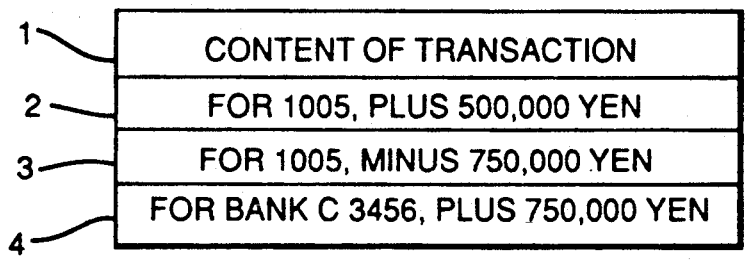
FIG. 20 is an example of a list of an executable transaction.

FIG. 19 is a flow-chart for making a list of an executable transaction and a list of a halted transaction made by the terminal 2 for dealing valuable goods. At first, assume that N=1 (step 710). As the confirmation key is depressed, the condition part of the list 57 of a halted transaction in the memory device 21 "depositing of 500,000 yen of special securities at counter" is fulfilled (step 720). Accordingly, "for 1001, plus 500,000 yen" is added to the list of executable transactions (step 730) and the balance list is revised (step 730). Then, the first transaction is deleted from the list 57 of a halted transactions (step 750). N is incremented (step 760). Since the condition part of the list 57 of a halted transaction, i.e. "balance of 1001−750,000 yen"is fulfilled, "for 1001, minus 750,000 yen" and "for bank C 3456, plus 750,000 yen" are also added to the list of executable transactions (step 730). A balance list in the memory device 21 is revised (step 740) and a corresponding transaction is deleted from the list of halted transactions in the memory device 21 (step 750). Since the list of a halted transaction is vacant (step 770), the processing device 28 may transmit an instruction for deleting the list 57 of a halted transaction of a customer identification number and a list 58 of an executable transaction (FIG. 20) from the file of halted transactions to the host computer 3. The host computer 3 may utilize the list of an executable transaction and increase the balance of a savings deposit of a customer (account number 1005) by 500,000 yen, thereafter execute the transferring transaction of 750,000 yen, decrease the balance of deposit by 750,000 yen and send a completion of transaction to the terminal 2 for dealing valuable goods. The terminal 2 for dealing valuable goods may receive it, print the content of transaction with the printer device 25, take the customer identifying medium and then complete the transaction. Lastly, a teller delivers a printed matter to the customer. With the foregoing, even if a transaction with special securities is performed in the present invention, the teller is not required for the procedure for specifying a transaction, so that burden of the teller may be reduced.

(d) An example relating to a transaction requiring a receipt stamp (payment of automobile tax):

Here will be described a case in which a customer having no customer identification medium of a bank deposits by cash at a counter and pays 40,000 yen for the automobile tax to Kanagawa Prefecture. At an initial menu of the input device 13 of the terminal 1 for specifying transaction, a condition of "not holding" the customer identification medium is selected by a customer. In case that the customer has a bank deposit card, the bank deposit card will be inserted into the customer identification device 14 and then information such as an identification number for use in identifying a customer is inputted through an input device. The customer identification device 14 may read the customer identification information (for example, the customer identification number) from the bank deposit card, store the read information in the memory device 11, perform a processing for identifying the customer (for example, the inputted identification number is sent to the host computer 3 for referring to the identification code), and at the same time, it may read the deposit balance of a customer from the file 4 of deposit balance and store it in the memory device 11 (step 130).

Figure 21:
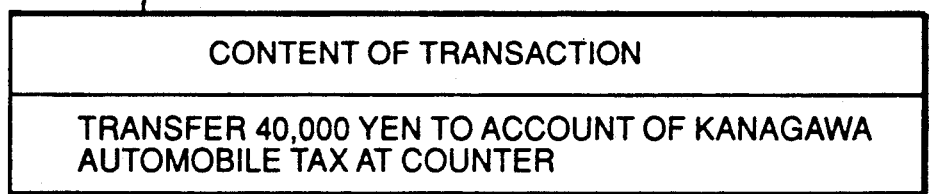
FIG. 21 is an example of a list of a transaction.
Figure 22:
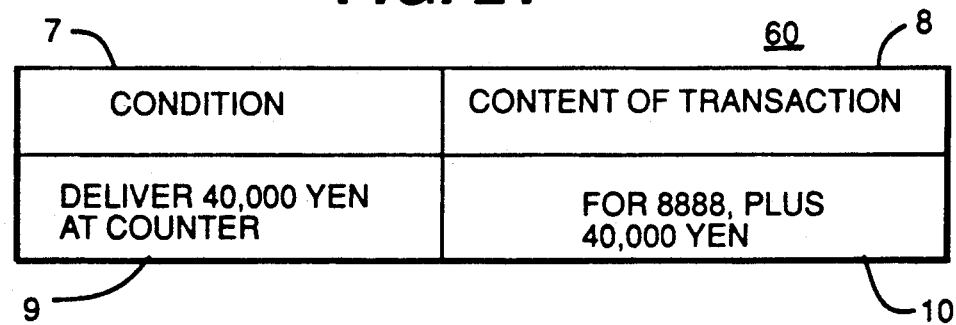
FIG. 22 is an example of a list of a halted transaction.

FIG. 5 is a balance list in the file 4 of the deposit balance. An input supporting part of the inputting device 13 may utilize information relating to an account held by a customer when a menu selection is made and does not display the type of account not held by the customer on the menu. It may request an inputting or personal identification information (such as the address, name and the like) required for performing a transaction against a customer not holding even a bank deposit card. Then, a menu of transaction items will appear on the inputting screen. As the transaction item, "deposit", "payment", "transferring", "cancellation", "payment of public utility charges", "tax payment" and "exchange of valuable goods for cash" are present and "tax payment" is selected. If the customer has no bank deposit card, its transaction item is restricted to "transfer", "payment of public utility charges", "tax payment" and "exchange of valuable goods for cash" and the like. If "tax payment" is selected as the transaction item, tax items will appear and "automobile tax" is selected. As tax items, there are "residence tax", "fixed asset tax", "automobile tax" and the like. Subsequently, as a transferred party, "Kanagawa Prefecture" is selected, "deposit" is selected as a financial source and its amount "40,000 yen" is inputted. In case that a customer has no bank deposit card, a selection item of financial source is restricted as compared with the case in which a customer has a bank deposit card, only "deposit" at a counter and "special deposit" having cash stored in advance at the terminal device 2 for dealing valuable goods will appear on a menu and "savings deposit" or "check deposit" does not appear on the selection menu. Lastly, "absence" of next transaction item is inputted and an inputting operation is finished. The inputted content of transaction is stored in the memory device 11 as a list 59 of content of transaction (FIG. 21). The terminal 1 for specifying transaction may check an executability of the inputted list of content of transaction 59. Since there is "depositing at counter" in the list of content of transaction, the processing device 18 may judge it as a halted transaction, make a list of a halted transaction 60 (FIG. 22) with "deposit of 40,000 yen at counter" being applied as a condition part and "for 8888, plus 40,000 yen" being applied as a content of transaction. Further, it makes a customer identification number at the customer identification device 14, sends its number to the host computer 3 together with the list of a halted transaction 60 and stores them in the file of halted transactions 5. At this time, 8888 is an automobile tax account of Kanagawa Prefecture and this is retrieved by utilizing an account number table. The account number table relates to a transferring account number for public utility charges or taxes and this is stored in the memory device 11 or a memory device in the host computer 3. The content of transaction is printed with the printer device 16 and a guidance information instructing a customer to go to a teller will be provided as an output. The customer identification medium issuing device 15 issues a customer identification medium having a customer identification number recorded therein, a customer receives this medium and then a procedure for specifying the transaction is finished, after returning a bank deposit card if one was inserted.

Figure 23:
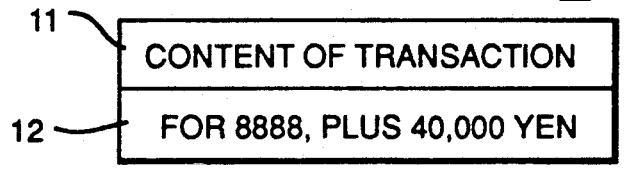
FIG. 23 is an example of an executable transaction.

A customer goes to the counter for dealing valuable goods and feeds the customer identification medium into the terminal 2 for dealing valuable goods. The customer identification device 24 reads the customer identification number recorded on the inserted customer identification medium, and reads the list of a halted transaction 60 and the balance list into the memory device 21 from the host computer 3 as a retrieval step 430. The processing device 28 may retrieve "depositing of 40,000 yen at counter" from the list of a halted transaction 60 to the list of delivered valuable goods (step 440), display the list in the displaying device 23 (step 450) and open a cash insertion port of the inserting or ejecting device 27 (step 470). When cash is fed into its feeding port, the cash is counted (step 480) and its result is displayed at the displaying device 22 (step 490). The fact that the received cash and the content of the list of delivered valuable goods coincide with each other is confirmed by a teller and a valuable goods acceptance key is depressed (step 500). The condition part of the list of a halted transaction "depositing by cash of 40,000 yen at counter" is fulfilled (step 620). The associated content of transaction "for 8888, plus 40,000 yen" is stored in the memory device 21 as a list of an executable transaction (step 630), the balance list in the memory device 21 is revised (step 640), and it is deleted from the list of halted transactions in the memory device 21 (step 650). Since the list of a halted transaction 60 in the memory device 21 is vacant, the list of an executable transaction 61 (FIG. 23) will be transmitted to the host computer 3 (step 540). Since the list of a halted transaction in the memory device 21 is vacant, an instruction for deleting the list of a halted transaction 60 of a customer from the file of halted transactions 5 is sent (step 540). The host computer may utilize the list of an executable transaction 61, increase the deposit balance of 8888 by 40,000 yen and send a completion of revision of balance to the terminal 2 for dealing valuable goods. The terminal 2 for dealing valuable goods displays a completion of transaction on the displaying device 22. A teller stamps a specific receipt of the bank on a written demand of automobile tax received from the customer, delivers it to the customer and the transaction is finished. The customer identification medium issued at the terminal 1 for specifying a transaction is taken (recovered) by the terminal 2 for dealing valuable goods.

Receipt formats for taxes or public utility charges are different from region to region or from each public corporation, and further a tax stamp must be attached as required, and so a full automatic transaction is not easily performed. In this invention, a procedure for specifying a transaction of which automatic processing is easily performed and an issuing procedure for issuing receipts of which automatic processing is not easily performed are separated from each other, thereby a burden of a teller is reduced and at the same time an increasing of cost required for automatic processing equipment can be restricted.

(e) An example relating to a transaction of multi-items:

There will be described a case in which a customer holding a bank deposit card of a transaction bank cancels a 2-year term deposit (account number 2001, deposit number 2, a balance of 500,00 yen including interest) which has been matured, transfers 150,000 yen to an account number 8765 of a bank A, pays 50,000 yen as automobile tax to Kanagawa Prefecture, withdraws 100,000 yen in cash, and newly deposits a total amount of 400,000 yen of a remaining 200,000 yen and a check of 200,000 yen at hand to a 3 year term deposit. The customer has no special deposit when a transaction is specified.

From an initial menu of the input device 13 of the terminal 1 for specifying a transaction, a condition of "not holding" a customer identification medium of a transaction bank is selected (step 10) and a bank deposit card is inserted into the customer identification device 14. The customer identification device 14 may perform customer identification processing (step 120) and at the same time it may read a balance list 62 for the customer (FIG. 24 (a)) from the file 4 of the deposit balance and then store it in the memory device 11 (step 130).

FIG. 25 shows a list of balance 68 in the file of deposit balance 4. Then, the input device 13 may display the menu for specifying a transaction and promote an inputting (step 140). As a transaction item, "cancellation" is selected, and as the type of account, "fixed term deposit" is selected and an identification number "2" of the fixed term deposit to be cancelled is inputted. Subsequently, as a processing method for cancelled money, "special deposit" is selected and "presence" of a next transaction is selected. Then, since a transaction item selection menu appears, "transfer" is selected, "special deposit" is selected as an item of financial source, "150,000 yen" of an amount is inputted, "bank A 8765" of a transferred account number is inputted, "a presence" of a next transaction item is selected. Subsequently, "tax" is selected as a selection item, "automobile tax" is selected as a tax item, "Kanagawa Prefecture" is selected as a transferred party, "special deposit" is selected as a financial source, "50,000 yen" of a paying amount is inputted and "a presence" of a next transaction item is selected. In addition, "payment" is selected as a transaction item, "special deposit" is selected as a financial source, "100,000 yen" is inputted as a paying amount and then "presence" of a next transaction is selected. Subsequently, "exchange of valuable goods for cash" is selected as a transaction item, "check" is selected as a changing matter, "200,000 yen" of a value is inputted, "special deposit" is selected as a cash processing method and "presence" of a next transaction item is selected. Lastly, "depositing" is selected as a transaction item, 3 year term deposit" is selected as the type of account, "special deposit" is selected as a financial source, "400,000 yen" of depositing amount is inputted, "absence" of the next transaction is specified and then an inputting operation is finished. The inputted content of a transaction is stored in the memory device 11 as a list of content of a transaction 63 (FIG. 26).

The processing device 18 checks the balance of 2-year term deposit account of an initial transaction of the list of content of a transaction 63 and a maturity date by utilizing the balance list 62. If the transaction specified date is after the maturity date, it stores "cancellation of 2001-2" and "for 8010, plus 500,000 yen" in the memory device 11 as the list of an executable transaction (step 240), and simultaneously revise the balance list (step 250). FIG. 24(b) is a revised balance list 64. In this case, 8010 is a number assigned to a special deposit account of a customer and this is generated by the processing device 18 or the host computer 3. Then, a balance of the special deposit account (8010) which is a financial source of a content of a second transaction in the list of content of a transaction 63 is checked by the balance list 64 to see if the balance is more than the transferred amount (150,000 yen) or not (step 230). Since the balance of account number 8010 is 500,000 yen at the first transaction, this condition is fulfilled, "for 8010, minus 150,000 yen" and "for bank A 8765, plus 150,000 yen" are added to a list of an executable transaction (step 240), and at the same time, the balance list 71 (FIG. 24 (c)) is also revised (step 250) and the balance of the account number 8010 is 350,000 yen. Since the content of the third transaction is similarly processed in such a way that the balance of the account number 8010 of the financial source is larger than the tax paying amount (50,000 yen), and "for 8010, minus 50,000 yen" and "for 8888, plus 50,000 yen" are added to the list of an executable transaction (step 240). The balance of special deposit in the balance list 72 (FIG. 24 (d)) is revised to 300,000 yen (step 250). In this case, 8888 is the automobile tax account number for Kanagawa Prefecture and this is read out of a transferring account table in the memory device 11. A content of the fourth transaction contains an acceptance or giving of valuable goods at a counter and its instantaneous execution is not possible (step 220), so that "request for withdrawal" and a relation "balance of 8010 minus 100,000 yen" are applied as a condition part. Then a list of a halted transaction comprised of "for 8010, minus 100,000 yen" and "withdrawal of 100,000 yen at counter" in the content of a transaction corresponding to the condition part is made and stored in the memory device 11 (step 260). Since the content of the fifth transaction contains an acceptance or giving of valuable goods at a counter, "deposit of check of 200,000 yen" is applied as a condition part and a list composed of a content of a transaction corresponding to this condition part of "setting of (checking deposit account number) minus 200,000 yen" and "for 8010, plus 200,000 yen" is added to the list of a halted transaction. The "checking deposit number" is a checking deposit number issuing a check and this is inputted when a teller inputs this number at a counter for dealing valuable goods.

Since the sixth transaction may not be instantaneously executed (step 230) due to the fact that the balance of a special deposit (300,000 yen) of a financial source of a fixed deposit is lower than a deposited amount (400,000 yen), the condition part has a relation "balance of 8010 minus 400,000 yen" and a list of a halted transaction is added with a list of the corresponding content of a transaction of "for 8010, minus 400,000 yen" and "for 2001-3, plus 400,000 yen" (step 260). Upon completion of classification of all contents of transactions of the list of content of a transaction (step 280), the processing device 18 arranges the list of an executable transaction within the memory device 11 and stores it in the memory device 11 (step 290). FIG. 27(a) shows a list 65 of executable transactions upon completion of classification, FIG. 27(b) is a list of executable transactions 66 arranged for every account and FIG. 28 is a list 67 of halted transactions upon completion of classification. The processing device 18 transmits the list 66 of an executable transaction arranged for accounts stored in the memory device and the list 67 of a halted transactions to the host computer 3 (step 160). The host computer 3 revises the deposit balance file 5 by utilizing the list 66 of an executable transaction and stores the list 67 of halted transactions in the file 5 of halted transactions. The terminal 1 for specifying a transaction may give guidance information to a customer to got to a teller at a counter for dealing valuable goods, print a content of a transaction with a printer device 16 (step 170), return a bank deposit card, issue a customer identification medium (step 190) and complete a transaction specifying processing.

Then, as a customer inserts a customer identification medium into the customer identification device 24 of the terminal 2 for dealing valuable goods at a counter for dealing valuable goods, a customer identification number is read from the customer identification medium (step 420), a balance list 72 of the customer is read from the deposit balance file 4 by utilizing this identification number, the list of a halted transaction 67 for the customer is read from the file 5 of halted transactions and stored in the memory device 21 (step 430). The processing device 28 makes a list of valuable goods to be accepted or given between the customer and the teller at a counter for dealing valuable goods from the list 67 of a halted transaction (hereinafter called a list of delivered valuable goods) (step 440), and then displays it in the displaying device 22 (step 450). FIG. 29 shows a list 67 of delivered valuable goods. In case that there are a plurality of items in the list of delivered valuable goods, a corresponding item is selected by a number. If this item relates to a delivery via securities, a "valuable goods acceptance confirmation key" is depressed, and in turn if this item relates to a payment, "a payment request key" is depressed (step 500). In the case that this item contains a depositing of a check, it is displayed in the displaying device 22 that an account number of the deposited check should be inputted. The account number is inputted through "numeric keys" in the input device 23. In this example, a payment request key having an item 1 selected is depressed at first. Then, a teller may receive a check of 200,000 yen from a customer, an item 2 is selected, an acceptance confirmation key is depressed, and an account number 3001 of the deposited checking deposit is inputted.

When all the items are selected or "input completion key" is depressed, the processing device 28 may check an executability of the list 67 of a halted transaction in the memory device 21 (step 510).

FIG. 11 is a flow-chart for expressing a procedure in which the terminal 2 for dealing valuable goods makes the list of an executable transaction and the list of a halted transaction. Since "request of payment" at the condition part of the first item of the list of a halted transaction in the memory device 21 and a relation "balance of 8010 minus 100,000 yen" are satisfied by the fact that a request of payment from the terminal 2 for dealing valuable goods and the balance of 8010 of 300,000 yen are applied, "for 8010, minus 100,000 yen" of the corresponding content of a transaction and "payment of 100,000 yen at counter" in the corresponding content of a transaction are stored in the memory device 21 as the list of an executable transaction (step 630). The balance list 64 in the memory device 21 is simultaneously revised to 200,000 yen (step 640) and this item is deleted from the list 67 of a halted transaction (step 650). Since "depositing of check of 200,000 yen" at the condition part of the second item is also satisfied by the fact that the valuable goods acceptance confirmation key is depressed at the terminal for dealing valuable goods (step 620), "for 3001, minus 200,000 yen" having 301 inputted to (checking deposit account) at the corresponding content of a transaction and "for 8010, plus 200,000 yen" are added to the executable list (step 630), the balance list is revised to 400,000 yen (step 640) and this item is deleted from the list 67 of halted transactions. A transaction taking much time for confirmation for changing another bank's check into cash is held until financial evidence of 3001 is confirmed even if a balance is revised. The condition part of the third item of a relation of "balance of 8010 minus 400,000 yen" is kept due to the fact that 200,000 yen of the balance of 400,000 yen in 8010 is held. Since all the items in the list 67 of a halted transaction are checked, the processing device 28 may extract "withdrawal of 100,000 yen by cash" from the list of an executable transaction in the memory device 21 (step 520) and send it to the money inserting or ejecting device 27. The inserting or ejecting device 27 may deliver 100,000 yen (step 530). The processing device 28 may transmit the remainder of list 73 (FIG. 30), a list 74 of a halted transaction (FIG. 31) and a customer identification number (0003) to the host computer 3 (step 540). The host computer 3 utilizes the list 73 of an executable transaction, revises the file 4 of balance of deposit and sets a flag of 8010 to 1. This list 74 of a halted transaction is stored in the file 5 of halted transactions. The terminal 2 for dealing valuable goods may print the content of a transaction with a printer device 25 (step 550), take the customer identification medium (step 570) and then a valuable goods dealing processing is completed.

Later, if 200,000 yen held in 8010 is revised to a utilizable condition (cashing), the host computer 3 reads the list of a halted transaction of customer identification number 0003 including 8010 from the file of halted transactions 5, confirms that a condition part of "balance of 8010 minus 400,000 yen" is satisfied, executes the corresponding content of a transaction "for 8010, minus 400,000 yen" and "for 2001-3, plus 400,000 yen" and sets its maturity date to "three years after specified date". Then all the transactions are completed.

With the foregoing, according to the present invention, it is possible to arrange a transaction executable at once when a transaction is specified and a transaction which may not be executed at once.

(f) Example in which a transaction is specified by utilizing a general terminal after securities and cash are stored:

There will be described a case in which a customer holding a bank deposit card for a transaction bank keeps a check of 500,000 yen in a special deposit and later utilizes a general terminal 6 placed at a residence to specify a transaction. In this case, a deposit of 150,000 yen to a bank A 5432 account, a deposit of 100,000 yen to a bank B 6543 account are carried out, and the remaining 250,000 yen is deposited to a 2-year term deposit. A customer at first inserts the bank deposit card into the customer identification device 24 of the terminal 2 for dealing valuable goods at a counter for dealing valuable goods. The customer identification device 24 may read the customer identification number from the bank deposit card and store it in the memory device 21 (step 420). A teller receiving a check from the customer may input a total amount of received money and depress the valuable goods confirmation key (step 500). Since the content of transaction is not specified, the customer identification number stored in the memory device 21 as a deposited amount for a special deposit and the amount are sent to the host computer 3 (step 540) and stored in the deposit balance file 4. When the terminal for dealing valuable goods receives a message of completion of storing from the host computer 3, the bank deposit card is returned, a customer identification medium is issued (step 580), a content of a transaction (acceptance) is printed and then a procedure for dealing valuable goods is completed.

After this operation, if the host computer 3 is called up from a general terminal 6, such as a personal computer, the host computer 3 may perform customer identification, and after reading the balance list of the customer from the deposit balance file 4, it may transmit the inputting procedure of a content of a transaction and a selection branch for specifying the content of a transaction to the general terminal 6 for displaying at the general terminal 6. The content of a transaction is inputted through an input, such as a personal computer in accordance with the inputting procedure. At first, as a transaction item, "transfer" is selected, and as a financial item, "special deposit" is selected, "150,000 yen" as the transferred amount and a transferred party "bank A 5432" are inputted, and, "presence of the next item of transaction" is selected. Similarly, "transfer" and "special deposit" are selected, and "100,000 yen" of the transferred amount and "bank B 6543" of a transferred party are inputted. Subsequent to the selection of "presence of the next transaction item", such items as "deposit", "fixed term deposit", "2 years", and "special deposit" are selected, and "250,000 yen" is selected as the deposited amount. Lastly, "absence of the next transaction item" is selected, thereby a transaction specifying procedure is finished. The inputted content of a transaction is stored in the memory device of the host computer 3 as a list 75 of the content of a transaction (FIG. 32).

The host computer 3 makes the list 76 of an executable transaction (FIG. 33) and a list of a halted transaction from the list 75 of content of a transaction and then stores them in the memory device. The list of an executable transaction is comprised of "for 8233 (special deposit), minus 500,000 yen", "for bank A 5432, plus 150,000 yen", "for bank B 6543, plus 100,000 yen" and "for 2007/1, plus 250,000 yen" and thus a list of a halted transaction is vacant. The host computer 3 utilizes the list 76 of an executable transaction and revises the file 4 of deposit balance, and thereafter transmits a completion of a transaction to the general terminal 6, and then a transaction specifying procedure and the transaction is finished. In the case that a printing device is connected to the general terminal 6, it is possible to print the content of a transaction.

In the case of performing the present transaction, the identification symbol for identifying a transaction is also printed when the content of a transaction is to be printed at the terminal 2 for dealing valuable goods and then a coincidence of the identification symbol for identifying the transaction is utilized as information for judging acceptability of specifying the present transaction. A symbol printed or impressed in the customer identification medium issued by the terminal 2 for dealing valuable goods is used as information for judging an acceptability of specifying the present transaction.

It may also be applicable that after the content of a transaction is specified by the general terminal 6, such as a personal computer, the customer identifying medium issued at the terminal for dealing valuable goods is inserted into the terminal 1 for specifying a transaction. Information of effectiveness or null for the customer identification medium is held in the transaction processing system and in case an ineffective customer identification medium is inserted, the customer identification medium is taken into the device.

With the foregoing, if the customer deposits cash or securities at a counter for dealing valuable goods, they are applied as a financial source and the processing can be specified for the deposit from a residence or other location than a bank. The deposit set in a bank once may be utilized as a transaction source without being changed into cash, so that it is not necessary to change the deposit to cash for every transaction and visit many counters of banks. Since the confirmation and storing work associated with the depositing or payment of cash is reduced to one operation, a burden of processing with a teller is also reduced.

(g) Example of transaction in which a customer identification medium is replaced by a bank deposit card:

In the above example, the bank deposit card and the customer identification medium are separately used, and it is also possible to realize the same function even if the customer identification medium is replaced by the bank deposit card. In this case, a "customer identification medium" in each of the examples may be replaced with a "bank deposit card".

According to the present invention, the terminal for dealing valuable goods such as an acceptance/giving of valuable goods and for paying out/depositing more than one securities and the terminal for specifying a transaction or transactions such as paying, transferring of account and the like are separately arranged. Thereby both devices may be utilized by a customer in any order, so that a burden of a teller is reduced and a waiting time of the customer may be shortened. In addition, the valuable goods confirmation key for instructing that the valuable goods is received through a teller is provided so that the invention may be applied for handling the securities such as stamps or vouchers which are not easy to handle by machine or a case in which an official stamp certificate is required later for paying of automobile tax (in the case of motor vehicle official inspection). Since there is no bill or sheet of paper for describing the content of a transaction, it is possible to eliminate the working operation associated with the handling of bills.

A separation of the specifying of content of a transaction and an acceptance or giving of valuable goods enables a handling of the acceptance of valuable goods and a specifying of content independently. The terminal for specifying a content of a transaction can be installed in a department store or a public facility other than a bank and a content of a transaction can be specified from a home through a personal computer, resulting in a reduction of the confused state in a business.

An arrangement of the file of halted transactions enables a transaction having no financial evidence to be specified and the transaction can be reserved so that an automatic execution of the transaction can be completed when the financial evidence is later accomplished.

While a preferred embodiment has been set forth along with modifications and variations to show specific advantageous details of the present invention, further embodiments, modifications and variations are contemplated within the broader aspects of the present invention, all as set forth by the spirit and scope of the following claims.

We claim:

1. A method for automatically performing a banking transaction with a computer controlled system having public terminals and storage, the steps of:
   storing financial transaction information such as deposit balances and relating to valuable goods, including securities, cash and checks to establish financial evidence relating to transactions such as withdrawal, deposit, transfer and dealing with valuable goods;
   receiving customer input at one of the public terminals dedicated to dealing with the valuable goods to perform withdrawal or deposit of valuable goods as one item of a list of a single banking transaction;
   receiving customer input at another one of the public terminals dedicated to specifying a transaction from among the transactions of deposit, withdrawal, and transfer as another item of the same list of a single banking transaction;
   one of said steps of receiving being a first performed receiving and the other being a subsequently performed receiving;
   executing all of the items of the list of a single banking transaction based upon the presence of sufficient financial evidence independently of the order of said steps of receiving; and
   at one of the corresponding dedicated terminals for dealing valuable goods and specifying a transaction used in said subsequently performed receiving, taking in an inserted medium for identifying the customer for completion of the transaction involving the subsequently performed receiving, and in response to said first performed receiving, issuing the medium for identifying the customer when the operations of the respective terminal are terminated.

2. A method for performing a banking transaction according to claim 1, in which said executing includes the following steps:
   judging the executability of the list of a single transaction by comparing a total amount of the single banking transaction with available balance independently of the order of said steps of receiving at the terminals,
   separating the list of a single banking transaction into a list of a transaction executable just after specifying the transaction and a list of a halted transaction in response to said judging, and
   completing the execution of the list of a transaction executable independently of the list of a halted transaction and storing the list of a halted transaction.

3. A method for performing a banking transaction according to claim 2, including,
   collecting the list of a halted transaction at time intervals by a host computer, and
   storing the collected lists of halted transactions as a file for halting transactions at a location central to the terminals.

4. A method for performing a banking transaction according to claim 1, further comprising the following steps to be performed at one of the terminals:
   displaying the user inputted content of a transaction;
   printing the content of the transaction;
   judging the executability of the content of transaction;
   after completion of the first performed receiving, guiding the customer by indicating another terminal for the subsequently performed receiving to complete the transaction; and
   said executing including communicating with a host computer.

5. A method for performing a banking transaction according to claim 1, including:
   operating a confirmation key, at the terminals for dealing valuable goods, only by a bank employee for indicating an acceptance of valuable goods through a person with respect to an acceptance of securities not received by machine.

6. A method for performing a banking transaction according to claim 1, including:
   said issuing including issuing the medium with recorded information including a total amount of valuable goods by the terminal for dealing valuable goods or a content of transaction specified by the terminal for specifying a transaction.

7. A method of performing a banking transaction according to claim 1, wherein at least one of said steps receiving is conducted at a general purpose terminal outside of a banking institution and includes the step of connecting said general purpose terminal over a telephone wire with the banking institution.

8. A method for performing a banking transaction according to claim 4, further comprising storing a program for controlling each of said steps, and storing the content of the transaction.

* * * * *